United States Patent [19]
Miller et al.

[11] 4,343,755
[45] Aug. 10, 1982

[54] PROCESS FOR EXTRUDING ETHYLENE POLYMERS

[75] Inventors: John C. Miller, Piscataway; Archibald L. Burnett, Warren, both of N.J.

[73] Assignee: Union Carbide Corporation, Danbury, Conn.

[21] Appl. No.: 64,399

[22] Filed: Aug. 8, 1979

Related U.S. Application Data

[63] Continuation-in-part of Ser. No. 940,005, Sep. 6, 1978, abandoned.

[51] Int. Cl.³ ............................................. B28B 3/20
[52] U.S. Cl. ................................ 264/176 R; 526/125; 526/352
[58] Field of Search ............... 264/176 F, 176 R, 349, 264/209; 425/202; 528/502; 526/352, 125

[56] References Cited

U.S. PATENT DOCUMENTS

| | | | |
|---|---|---|---|
| 2,702,410 | 2/1955 | Brown | 264/176 R |
| 3,298,792 | 1/1967 | Drusco | 526/351 |
| 3,344,218 | 9/1967 | Chopra et al. | 264/176 F |
| 3,472,829 | 10/1969 | Claybaugh et al. | 264/176 F |
| 3,486,192 | 12/1969 | Roy | 425/202 |
| 3,517,095 | 6/1970 | Dunnington et al. | 264/176 F |
| 3,596,320 | 8/1971 | Manning et al. | 264/349 |
| 3,730,492 | 5/1973 | Maddock | 425/202 |
| 3,756,574 | 5/1973 | Maddock | 425/202 |
| 3,906,065 | 9/1975 | Schneider et al. | 264/349 |
| 3,962,205 | 6/1976 | Ward et al. | 526/352 |
| 3,975,473 | 8/1976 | Mulvaney | 264/23 |
| 4,082,880 | 4/1978 | Zboril | 264/209 |
| 4,093,692 | 6/1978 | Hill | 264/95 |
| 4,243,619 | 1/1981 | Fraser et al. | 526/128 |

FOREIGN PATENT DOCUMENTS

| | | | |
|---|---|---|---|
| 47-40892 | 10/1972 | Japan | 264/349 |
| 1011950 | 8/1961 | United Kingdom | 264/349 |

OTHER PUBLICATIONS

Modern Plastics Encyl. 1973-1974, Oct. 1973, p. 762.
"Buyers Guide to HDPE Film Extrusion Systems", Plastics Tech., pp. 69-77, Jun. 1978.
Plastiques Modernes et Elastomeres, pp. 51-54; Dec. 1978.
Tappi 1980 Paper Synthetics Conf. Panel Discussion, by R. Knittel Wed. 9-17-80, Sterling Extruder, Corp. (Low P. LDPE Film Extrusion).
"The Extrusion of LDPE" by Wheeler, Paper, Film & Foil Conv., pp. 49-55, Nov. 1980.
"Extruder Productivity: Big Gains in 5 Years", Plastics World, pp. 48-53; Jul. 1978.

*Primary Examiner*—Jay H. Woo
*Attorney, Agent, or Firm*—Clement J. Vicari; Robert C. Brown

[57] ABSTRACT

A process comprising forming an extrudate, preferably in the form of a film, from an ethylene polymer which, in an extruder, melts rapidly and experiences slow shear thinning by melt extruding said polymer through an extruder having an extrusion screw therein with a length to diameter ratio of between about 15:1 to 21:1.

16 Claims, 7 Drawing Figures

PROCESS FOR EXTRUDING ETHYLENE POLYMERS

CROSS REFERENCES TO RELATED PATENT APPLICATIONS

This patent application is a continuation-in-part of patent application Ser. No. 940,005 filed Sept. 6, 1978 now abandoned.

FIELD OF THE INVENTION

This invention relates to a process comprising forming an extrudate, preferably in the form of a film, from ethylene polymer which, in an extruder, melts rapidly and experiences slow shear thinning, by melt extruding said polymer through an extruder having an extrusion screw therein with a length to diameter ratio of between about 15:1 to 21:1.

BACKGROUND OF THE INVENTION

Most commercial low density polyethylenes are polymerized in heavy walled autoclaves or tubular reactors at pressures as high as 50,000 psi and temperatures up to 300° C. The molecular structure of high pressure low density polyethylene is highly complex. The permutations in the arrangement of its simple building blocks are essentially infinite. High pressure resins are characterized by an intricate long chain branched molecular architecture. These long chain branches have a dramatic effect on the melt rheology of the resins. High pressure low density polyethylene resins also possess a spectrum of short chain branches generally 1 to 6 carbon atoms in length which control resin crystallinity (density). The frequency distribution of these short chain branches is such that, on the average, most chains possess the same average number of branches. The short chain branching distribution characterizing high pressure low density polyethylene can be considered narrow.

Low density polyethylene can exhibit a multitude of good properties. It is flexible and has a good balance of mechanical properties such as tensile strength, impact resistance, burst strength, and tear strength. In addition, it retains its strength down to relatively low temperatures. Certain of these resins do not embrittle at temperatures as low as −70° C. Low density polyethylene has good chemical resistance, and it is relatively inert to acids, alkalis, and inorganic solutions. It is, however, sensitive to hydrocarbons, halogenated hydrocarbons, and to oils and greases. Low density polyethylene has excellent dielectric strength.

More than 50% of all low density polyethylene is processed into film. This film is primarily utilized in packaging applications such as for meat, produce, frozen food, ice bags, boilable pouches, textile and paper products, rack merchandise, industrial liners, shipping sacks, pallet stretch and shrink wrap. Large quantities of wide heavy gage film are used in construction and agriculture.

Most low density polyethylene film is produced by the tubular blown film extrusion process. Blown film products range from tubes of film which are about two (2) inches in diameter or smaller and which are used as sleeves or pouches, to huge bubbles that provide a lay flat of about twenty (20) feet in width when slit along an edge and opened up, will measure forty (40) feet wide.

Polyethylene can also be produced at low to medium pressures by homopolymerizing ethylene or copolymerizing ethylene with various alpha-olefins using heterogeneous catalysts based on transition metal compounds of variable valence. These resins generally possess little, if any, long chain branching and the only branching to speak of is short chain branching. Branch length is controlled by comonomer type. Branch frequency is controlled by the concentration of comonomer(s) used during copolymerization. Branch frequency distribution is influenced by the nature of the transition metal catalyst used during the copolymerization process. The short chain branching distribution characterizing transition metal catalyzed low density polyethylene can be very broad.

U.S. patent application Ser. No. 892,325 filed Mar. 21, 1978, abandoned, and refiled on Feb. 27, 1979 as Ser. No. 014,414, now U.S. Pat. No. 4,302,566 in the names of F. J. Karol et al and entitled Preparation of Ethylene Copolymers In Fluid Bed Reactor, and which corresponds to European Patent Application No. 79100953.3 which was published as Publication No. 004,645 on Oct. 17, 1979, discloses that ethylene copolymers, having a density of 0.91 to 0.96, a melt flow ratio of $\geq 22$ to $\leq 32$ and a relatively low residual catalyst content can be produced in granular form, at relatively high productivities if the monomer(s) are polymerized in a low pressure gas phase process with a specific high activity Mg-Ti containing complex catalyst which is blended with an inert carrier material.

U.S. Patent Application Ser. No. 892,322 filed Mar. 31, 1978, now abandoned and refiled on Feb. 16, 1979 as Ser. No. 012,720, now U.S. Pat. No. 4,302,565 in the names of G. L. Goeke et al and entitled Impregnated Polymerization Catalyst, Process For Preparing, and Use For Ethylene Copolymerization, and which corresponds to European Patent Application No. 79100958.2 which was published as Publication No. 004,647 on Oct. 17, 1979, discloses that ethylene copolymers, having a density of 0.91 to 0.96, a melt flow of $\geq 22$ to $\leq 32$ and a relatively low residual catalyst content can be produced in granular form, at relatively high productivities if the monomer(s) are polymerized in a low pressure gas phase process with a specific high activity Mg-Ti containing complex catalyst which is impregnated in a porous inert carrier material.

U.S. patent application Ser. No. 892,037 filed Mar. 31, 1978, abandoned, and refiled on Feb. 27, 1979 as Ser. No. 014,412, in the names of B. E. Wagner et al and entitled Polymerization Catalyst, Process for Preparing And Use For Ethylene Homopolymerization, and which corresponds to European Patent Application No. 79100957.4 which was published as Publication No. 004,646 on Oct. 17, 1979, discloses that ethylene homopolymers having a density of about $\geq 0.958$ to $\leq 0.972$ and a melt flow ratio of about $\geq 22$ to about $\leq 32$ which have a relatively low residual catalyst residue can be produced at relatively high productivities for commercial purposes by a low pressure gas phase process if the ethylene is homopolymerized in the presence of a high activity Mg-Ti containing complex catalyst which is blended with an inert carrier material. The granular polymers thus produced are useful for a variety of end-use applications.

The polymers produced in such United States patent applications, hereinafter called The Prior U.S. Applications, when used in an extruder, melt rapidly and experience slow shear thinning.

The polymers as produced by the process of said applications using the Mg-Ti containing complex catalyst possess a narrow molecular weight distribution, Mw/Mn, of about $\geq 2.7$ to $\leq 3.6$, and preferably, of about $\geq 2.8$ to $\leq 3.4$.

The rheology of polymeric material depends to a large extent on molecular weight and molecular weight distribution.

In film extrusion, two aspects of rheological behavior are important: shear and extension. Within a film extruder and extrusion die, a polymeric melt undergoes severe shearing deformation. As the extrusion screw pumps the melt to and through the film die, the melt experiences a wide range of shear rates. Most film extrusion processes are thought to expose the melt to shear at rates in the 100–5000 $sec^{-1}$ range. Polymeric melts are known to exhibit what is commonly termed shear thinning behavior, i.e., non-Newtonian flow behavior. As shear rate is increased, viscosity (the ratio of shear stress, $\tau$, to shear rate, $\dot{\gamma}$) decreases. The degree of viscosity decrease depends upon the molecular weight, its distribution, and molecular conformation, i.e., long chain branching of the polymeric material. Short chain branching has little effect on shear viscosity. In general high pressure low density polyethylenes have a broad molecular weight distribution and show enhanced shear thinning behavior in the shear rate range common to film extrusion. Narrow molecular weight distribution resins of the present invention exhibit reduced shear thinning behavior at extrusion grade shear rates. The consequences of these differences are that the present narrow distribution resins require higher power and develop higher pressures during extrusion than the high pressure low density polyethylene resins of broad molecular weight distribution and of equivalent average molecular weight.

The rheology of polymeric materials is customarily studied in shear deformation. In pure shear the velocity gradient of the deforming resin is perpendicular to the flow direction. The mode of deformation is experimentally convenient but does not convey the essential information for understanding material response in film fabrication processes. As one can define a shear viscosity in terms of shear stress and shear rate, i.e.:

$$\eta \text{ shear} = \tau 12/\dot{\gamma}$$

where
$\eta$ shear = shear viscosity (poise)
$\tau 12$ = shear stress (dynes/cm$^2$)
$\dot{\gamma}$ = shear rate (sec$^{-1}$)

an extensional viscosity can be defined in terms of normal stress and strain rate, i.e.,:

$\eta$ ext = $\sigma_\parallel / \dot{\epsilon}$
$\eta$ ext = extensional viscosity (poise)
$\sigma_\parallel$ = normal stress (dynes/cm$^2$)
$\dot{\epsilon}$ = strain rate (sec$^{-1}$)

In pure extensional flow, unlike shear flow, the velocity gradient is parallel to the flow direction. Commercial extrusion processes involve both shear and extensional deformations. In film extrusion (tubular blow and slot cast) the extensional rheology characteristics of a resin are exceedingly important. They may, in fact, dominate the process.

Extensional viscosity can be measured by a number of experimental techniques (see, for example, J. L. White, Report No. 104 of the Polymer Science and Engineering Dept., Univ. of Tenn., Knoxville). The procedure used herein is a constant strain rate method. Briefly, the method uses a servo-controlled Instron tensile testing machine. The ends of a molten ring of polymer, immersed in a silicone oil bath, are separated at an accelerating rate according to the following relationship:

$$L(t) = L_o \exp(\epsilon t) \qquad (3)$$

where
$L(t)$ = jaw separation at time t.
$L_o$ = initial jaw separation
$\epsilon$ = strain rate (sec$^{-1}$), a constant
t = time A force transducer measured load during the deformation. Extensional velocity is calculated by dividing stress by strain rate and is determined as a function of displacement or time during the deformation (Temp.~150° C.).

When high pressure low density polyethylene melts are deformed according to equation (3), extensional viscosity is observed to increase at an accelerating rate with log time. This behavior is shown in FIG. 1 for high pressure polymerized low density polyethylene having a melt index of 0.65 and a density of 0.922. The melt is said to strain harden. This strain hardening intensifies as the strain rate is increased. In some cases the melt may exhibit unbounded stress growth.

The ethylene polymers, as described in The Prior U.S. Applications, do not, in general, show unbounded stress growth. Certain broad molecular weight distribution resins do strain harden, but their extensional viscosity seems to increase linearly with log time (See FIG. 2). The narrow molecular weight distribution resins as described in The Prior U.S. Applications, for example, show little strain hardening when strain rates are low. FIG. 3 shows that strain hardening intensifies at higher strain rates but not to the degree observed in high pressure low density polyethylene or ethylene hydrocarbon copolymers having broad molecular weight distribution.

High pressure low density polyethylene can be considered "soft" in shear and "stiff" in extension when compared to ethylene hydrocarbon copolymers of narrow molecular weight distribution. Ethylene hydrocarbon copolymers having a narrow molecular weight distribution exhibit the opposite rheology. They are "stiff" in shear and "soft" in extension. The terms "soft" and "stiff", as used herein, refer to the relative magnitude of shear and extensional viscosity when comparing the rheology of high pressure low density polyethylene and narrow molecular distribution polymers of the present invention.

High pressure low density polyethylene is generally formed into film by melt extruding the polyethylene, in an extruder having an extrusion screw with a length to diameter ratio of greater than 21:1. In a commercial operation for forming film from high pressure low density polyethylene, the extrusion screw has a length to diameter ratio of 24:1 or longer. These long extrusion screws use mixing device to get maximum output rates and acceptable film quality (melt temperature homogeneity). If an extrusion screw, with length to diameter ratios between 15:1 to 21:1 is used to melt extrude high pressure low density polyethylene, film quality is unacceptable due to poor temperature uniformity. The quality of the film can be improved using an extrusion screw with length to diameter ratio between 15:1 to 21:1 if the extrusion screw is cooled. However, cooling the extrusion screw is not commercially feasible since it drastically reduces output rates and increases power consumption per pound. This can be summarized in the following Table (for blown film extrusion):

TABLE

| Extrusion Screw (L/D) | Film[a] Quality | Maximum Extruder Rate at Full RPM | Power Consumption | Power Consumption Per Pound | Cooling Limited Rate | Type of Low Density Polyethylene |
|---|---|---|---|---|---|---|
| 20:1 or >20:1 | + | 1.0 | 1.0 | 1.00 | 1.0 | High Pressure |
| 15:1–21:1 | – | 0.80 | 0.70 | 0.88 | 1.1 | High Pressure |
| 15:1–21:1 (Cooled) | + | 0.50 | 0.80 | 1.60 | 1.0 | High Pressure |
| 15:1–21:1[b] | + | 0.95 | 1.0 | 1.00 | 1.0 | Low Pressure |

[a] film quality with (–) designation lacks temperature uniformity.
[b] For the low density resins described herein, an extrusion screw of about 15:1–21:1 will provide satisfactory melt quality as defined by pressure variations at the head of the extruder.

The unique rheological behavior of the narrow molecular weight polyethylene resins produced as described in The Prior U.S. Applications, for example, manifest itself in several ways in forming film in the tubular blown film extrusion process. If these resins are processed on commercially available equipment, i.e., extruders wherein the extrusion screw has a length to diameter ratio >21:1 particularly 24:1, power consumption is high and melt temperatures are high causing either extruder power or bubble cooling to limit the output rate below that experienced with high pressure low density polyethylene resins.

The use however, of an extrusion screw having a length to diameter ratio of between 15:1–21:1 in an extruder used to melt extrude these narrow molecular weight ethylene polymers into film reduces power consumption and melt temperature and produces good film quality.

Films suitable for packaging applications must possess a balance of key properties in order to meet the performance requirements essential for broad end use utility and wide commercial acceptance. These properties include film optical quality, for example, haze, gloss, and see-through characteristics. Mechanical strength properties such as puncture resistance, tensile strength, impact strength, stiffness, and tear resistance are important. Vapor transmission and gas permeability characteristics are important considerations in perishable goods packaging. Performance in film converting and packaging equipment is influenced by film properties such as coefficient of friction, blocking, heat sealability, and flex resistance. High pressure low density polyethylene has a wide range of utility such as in food packaging and non-food packaging applications. Bags, commonly produced from low density polyethylene, include shipping sacks, textile bags, laundry and dry cleaning bags and trash bags. Low density polyethylene film can be used as drum liners for a number of liquid and solid chemicals and as protective wrap inside wooden crates. Low density polyethylene film can be used in a variety of agricultural and horticultural applications such as protecting plants and crops, as mulching, for storing of fruits and vegetables. Additionally, low density polyethylene film can be used in building applications such as a moisture or moisture vapor barrier. Further, low density polyethylene film can be coated and printed for use in newspapers, books, etc.

Possessing a unique combination of the aforedescribed properties, high pressure low density polyethylene is the most important of the thermoplastic packaging films. It accounts for about 50% of the total usage of such films in packaging. Films made from the polymers of the present invention preferably the ethylene hydrocarbon copolymers, offer an improved combination of end use properties and are especially suited for many of the applications already served by high pressure low density polyethylene.

An improvement in any one of the properties of a film or an improvement in the extrusion characteristics of the resin or an improvement in the film extrusion process itself is of the utmost importance regarding the acceptance of the film as a substitute for high pressure low density polyethylene in many end use applications.

DRAWINGS

SUMMARY OF THE INVENTION

Figure 1:
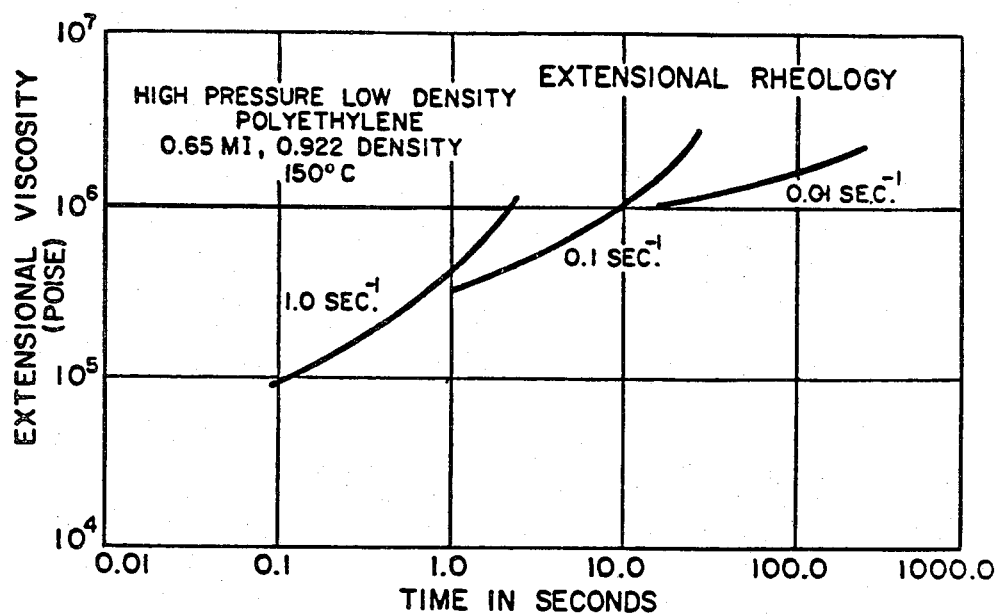
FIGS. 1, 2 and 3 show extensional viscosity-log time plots for three types of low density polyethylene.
Figure 2:
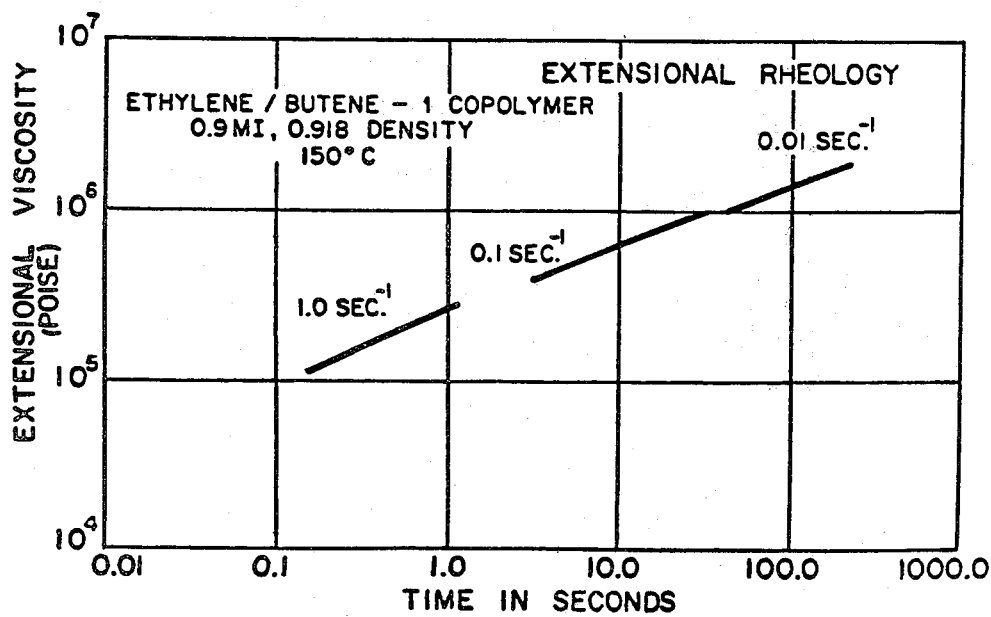
Figure 3:
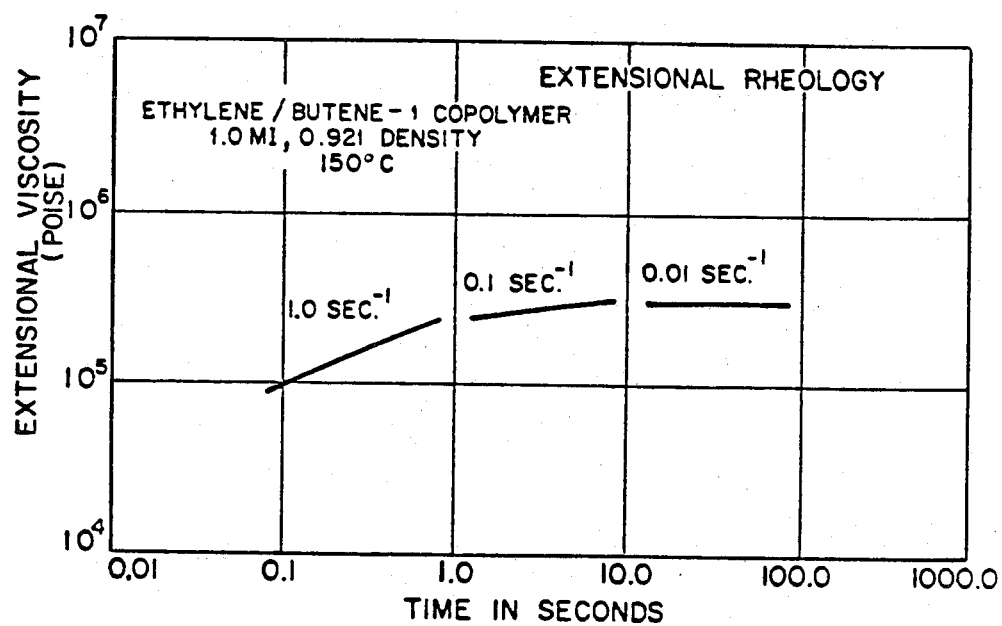

It has been found that a process comprising forming an extrudate, preferably in the form of a film, from ethylene polymer which, in an extruder, melts rapidly and experiences slow shear thinning by melt extruding said polymer through an extruder having an extrusion screw therein with a length to diameter ratio of between about 15:1 to 21:1 reduces power consumption and melt temperatures of the polymer as compared to forming an extrudate using an extrusion screw with a length to diameter ratio of greater than 21:1.

Also, the use of an extrusion screw with a length to diameter ratio of between about 15:1 to 21:1 to melt extrude such ethylene polymers results in superior machine efficiency as compared with the use of an extrusion screw with a length to diameter ratio of greater than 21:1. Additionally, acceptable temperature uniformity is achieved by using an extrusion screw with a length to diameter ratio of between about 15:1 to 21:1.

DESCRIPTION OF THE PREFERRED EMBODIMENT

The Ethylene Polymers

The ethylene polymers which may be used in the process of the present invention are homopolymers of ethylene or copolymers of a major mol percent ($\geq 90\%$) of ethylene, and a minor mol percent ($\leq 10\%$) of one or more $C_3$ to $C_8$ alpha olefins. The $C_3$ to $C_8$ alpha olefins should not contain any branching on any of their carbon atoms which is closer than the fourth carbon atom. The preferred $C_3$ to $C_8$ alpha olefins are propylene, butene-1, pentene-1, hexene-1 and octene-1.

The ethylene polymers have a melt flow ratio of $\geq 18$ to $\leq 32$, and preferably of $\geq 22$ to $\leq 32$. The melt flow ratio value is another means of indicating the molecular weight distribution of a polymer. The melt flow ratio (MFR) range of $\geq 22$ to $\leq 32$ thus corresponds to a Mw/Mn value range of about 2.7 to 4.1. The polymers herein include a Mw/Mn value in the range of about 2.2 to 4.1.

The homopolymers have a density of about $\geq 0.958$ to $\leq 0.972$ and preferably of about $\geq 0.961$ to $\leq 0.968$.

The copolymers have a density of about $\geq 0.91$ to $\leq 0.96$ and preferably $\geq 0.917$ to $\leq 0.955$, and most preferably, of about $\geq 0.917$ to $\leq 0.935$. The density of the copolymer, at a given melt index level for the copolymer, is primarily regulated by the amount of the $C_3$ to $C_8$ comonomer which is copolymerized with the ethylene. In the absence of the comonomer, the ethylene would homopolymerize with the catalyst of the present invention to provide homopolymers having a density of about $\geq 0.96$. Thus, the addition of progressively larger amounts of the comonomers to the copolymers results in a progressive lowering of the density of the copolymer. The amount of each of the various $C_3$ to $C_8$ comonomers needed to achieve the same result will vary from monomer to monomer, under the same reaction conditions.

Thus, to achieve the same results, in the copolymers, in terms of a given density, at a given melt index level, larger molar amounts of the different comonomers would be needed in the order of $C_3 > C_4 > C_5 > C_6 > C_7 > C_8$.

The melt index of a homopolymer or copolymer is a reflection of its molecular weight. Polymers having a relatively high molecular weight, have a relatively low melt index. Ultra-high molecular weight ethylene polymers have a high load (HLMI) melt index of about 0.0 and a very high molecular weight ethylene polymers have a high load melt index (HLMI) of about 0.0 to about 1.0. The polymers of the present invention have a standard or normal load melt index of $\geq 0.0$ to about 50, and preferably of about 0.5 to 35, and a high load melt index (HLMI) of about 11 to about 950. The melt index of the polymers which are used in the process of the present invention is a function of a combination of the polymerization temperature of the reaction, the density of the copolymer and the hydrogen/monomer ratio in the reaction system. Thus, the melt index is raised by increasing the polymerization temperature and/or by decreasing the density of the polymer and/or by increasing the hydrogen/monomer ratio.

The ethylene polymers of the present invention have an unsaturated group content of $\leq 1$, and usually $\geq 0.1$ to $\leq 0.3$, C=C/1000 carbon atoms, and a cyclohexane extractables content of less than about 3, and preferably less than about 2, weight percent.

The ethylene polymers of the present invention have a residual catalyst content, in terms of parts per million of titanium metal, of the order of $\leq 20$ parts per million, (ppm) at a productivity level of $\geq 50,000$, and of the order of $\leq 10$ ppm at a productivity level of $\geq 100,000$ and of the order of $\leq 3$ parts per million at a productivity level of $\geq 300,000$. Where the polymers are made with halogen containing catalysts wherein the halogen is chlorine, the polymers have a Cl residue content of $\leq 140$ ppm at a productivity of $\geq 50,000$, a Cl content of $\leq 70$ ppm at a productivity of $\geq 100,000$, and a Cl content $\leq 21$ ppm at a productivity of $\geq 300,000$. The ethylene polymers are readily produced at productivities of up to about 300,000.

The polymers of the present invention are produced as granular materials which have an average particle size of the order of about 0.005 to about 0.06 inches, and preferably of about 0.02 to about 0.04 inches, in diameter. The particle size is important for the purposes of readily fluidizing the polymer particles in the fluid bed reactor, as described below. The polymers of the present invention have a settled bulk density of about 15 to 32 pounds per cubic foot.

The homopolymers and copolymers of the present invention are useful for making film.

For film making purposes the preferred copolymers of the present invention are those having a density of about $\geq 0.917$ to $\leq 0.924$; a molecular weight distribution (Mw/Mn) of $\geq 2.7$ to $\leq 3.6$, and preferably of about $\geq 2.8$ to 3.1; and a standard melt index of $\geq 0.5$ to $\leq 5.0$ and preferably of about $\geq 1.0$ to $\leq 4.0$. The films have a thickness of $>0$ to $\leq 10$ mils and preferably of $>0$ to $\leq 5$ mils.

High Activity Catalyst

The compounds used to form the high activity catalyst used to make the polymers of the present invention comprise at least one titanium compound, at least one magnesium compound, at least one electron donor compound, at least one activator compound and at least one inert carrier material, as defined below.

The titanium compound has the structure

Ti(OR)$_a$X$_b$ wherein
R is a $C_1$ to $C_{14}$ aliphatic or aromatic hydrocarbon radical, or COR' where R' is a $C_1$ to $C_{14}$ aliphatic or aromatic hydrocarbon radical,
X is Cl, Br or I, a is 0 or 1, b is 2 to 4 inclusive and a+b=3 or 4.

The titanium compounds can be used individually or in combinations thereof, and would include TiCl$_3$, TiCl$_4$, Ti(OCH$_3$)Cl$_3$, Ti(OC$_6$H$_5$)Cl$_3$, Ti(OCOCH$_3$)Cl$_3$ and Ti(OCOC$_6$H$_5$)Cl$_3$.

The magnesium compound has the structure

MgX$_2$ wherein X is Cl, Br or I. Such magnesium compounds can be used individually or in combinations thereof and would include MgCl$_2$, MgBr$_2$ and MgI$_2$. Anhydrous MgCl$_2$ is the particularly preferred magnesium compound.

About 0.5 to 56, and preferably about 1 to 10, mols of the magnesium compound are used per mol of the titanium compound in preparing the catalysts employed to produce the polymers of the present invention.

The titanium compound and the magnesium compound should be used in a form which will facilitate their dissolution in the electron donor compound, as described herein below.

The electron donor compound is an organic compound which is liquid at 25° C. and in which the titanium compound and the magnesium compound are partially or completely soluble. The electron donor compounds are known, as such, or as Lewis bases.

The electron donor compounds would include such compounds as alkyl esters of aliphatic and aromatic carboxylic acids, aliphatic ethers, cyclic ethers and aliphatic ketones. Among these electron donor compounds the preferable ones are alkyl esters of $C_1$ to $C_4$ saturated aliphatic carboxylic acids; alkyl esters of $C_7$ to $C_8$ aromatic carboxylic acids; $C_2$ to $C_8$, and preferably $C_3$ to $C_4$, aliphatic ethers; $C_3$ to $C_4$ cyclic ethers, and preferably $C_4$ cyclic mono- or di-ether; $C_3$ to $C_6$, and preferably $C_3$ to $C_4$, aliphatic ketones; The most preferred of these electron donor compounds would include methyl formate, ethyl acetate, butyl acetate, ethyl ether, hexyl ether, tetrahydrofuran, dioxane, acetone and methyl isobutyl ketone.

The electron donor compounds can be used individually or in combinations thereof.

About 2 to 85, and preferably about 3 to 10 mols of the electron donor compound are used per mol of Ti.

The activator compound has the structure $$Al(R'')_c X'_d H_e$$

wherein X' is Cl or OR''', R'' and R''' are the same or different and are $C_1$ to $C_{14}$ saturated hydrocarbon radicals, d is 0 to 1.5, e is 1 or 0 and $c+d+e=3$.

Such activator compounds can be used individually or in combinations thereof and would include $Al(C_2H_5)_3$, $Al(C_2H_5)_2Cl$, $Al(i-C_4H_9)_3$, $Al_2(C_2H_5)_3Cl_3$, $Al(i-C_4H_9)_2H$, $Al(C_6H_{13})_3$, $Al(C_2H_5)_2H$ and $Al(C_2H_5)_2(OC_2H_5)$.

About 10 to 400, and preferably about 10 to 100, mols of the activator compound are used per mol of the titanium compound in activating the catalyst employed to produce the polymers of the present invention.

The carrier materials are solid, particulate materials which are inert to the other components of the catalyst composition, and to the other active components of the reaction system. These carrier materials would include inorganic materials such as oxides of silicon and aluminum and molecular sieves, and organic materials such as olefin polymers such as polyethylene. The carrier materials are used in the form of dry powders having an average particle size of about 10 to 250, and preferably of about 50 to 150 microns. These materials are also preferably porous and have a surface area of $\geq 3$, and preferably of $\geq 50$, square meters per gram. The carrier material should be dry, that is, free of absorbed water. This is normally done by heating or pre-drying the carrier material with a dry inert gas prior to use. The inorganic carrier may also be treated with about 1 to 8 percent by weight of one or more of the aluminum alkyl compounds described above to further activate the carrier.

Catalyst Preparation

The catalyst used to produce the polymers of the present invention is prepared by first preparing a precursor composition from the titanium compound, the magnesium compound, and the electron donor compound, as described below. The carrier material can then be impregnated with precursor composition and then treated with the activator compound in one or more steps as described below. Alternatively the precursor composition can be treated with the carrier material and the activator compound in one or more steps as described below.

The precursor composition is formed by dissolving the titanium compound and the magnesium compound in the electron donor compound at a temperature of about 20° C. up to the boiling point of the electron donor compound. The titanium compound can be added to the electron donor compound before or after the addition of the magnesium compound, or concurrent therewith. The dissolution of the titanium compound and the magnesium compound can be facilitated by stirring, and in some instances by refluxing, these two compounds in the electron donor compound. After the titanium compound and the magnesium compound are dissolved, the precursor composition may be isolated by crystallization or by precipitation with a $C_5$ to $C_8$ aliphatic or aromatic hydrocarbon such as hexane, isopentane or benzene.

The crystallized or precipitated precursor composition may be isolated, in the form of fine, free flowing particles having an average particle size of about 10 to 100 microns and a settled bulk density of about 18 to 33 pounds per cubic foot.

When thus made as disclosed above the precursor composition has the formula $$Mg_m Ti_f(OR)_n X_p[ED]_q$$

wherein
ED is the electron donor compound,
m is $\geq 0.5$ to $\leq 56$, and preferably $\geq 1.5$ to $\leq 5$,
n is 0, 1 or 2
p is $\geq 2$ to $\leq 116$, and preferably $\geq 6$ to $\leq 14$,
q is $\geq 2$ to $\leq 85$, and preferably $\geq 4$ to $\leq 11$,
R is a $C_1$ to $C_{14}$ aliphatic or aromatic hydrocarbon radical, or COR' wherein R' is a $C_1$ to $C_{14}$ aliphatic or aromatic hydrocarbon radical and,
X is Cl, Br or I, or mixtures thereof.

The precursor composition may then be impregnated, in a weight ratio of about 0.033 to 1, and preferably about 0.1 to 0.33, parts of the precursor composition into one part by weight of the carrier material.

The impregnation of the dried (activated) support with the precursor composition may be accomplished by dissolving the precursor composition in the electron donor compound, and by then admixing the support with the dissolved precursor composition so as to allow the precursor composition to impregnate the support. The solvent is then removed by drying at temperatures of $\leq 70°$ C.

The support may also be impregnated with the precursor composition by adding the support to a solution of the chemical raw materials used to form the precursor composition in the electron donor compound, without isolating the precursor composition from such solution. The excess electron donor compound is then removed by drying at temperatures of $\leq 70°$ C.

Alternatively, the precursor composition can be diluted with the carrier material. The dilution of the precursor composition can be accomplished before the precursor composition is partially or completely activated, as disclosed below, or concurrent with such activation. The dilution of the precursor composition is accomplished by mechanically mixing or blending about 0.033 to 1, and preferably about 0.1 to 0.33, parts of the precursor composition with one part by weight of the carrier material.

Activation of Precursor Composition

In order to be used in the fluid bed process described herein the precursor composition must be fully or completely activated, that is, it must be treated with sufficient activator compound to transform the Ti atoms in the precursor composition to an active state.

It has been found that, in order to prepare a useful catalyst it is necessary to conduct the activation in such a way that, at least, the final activation stage must be conducted in the absence of solvent so as to avoid the need for drying the fully active catalyst to remove solvent therefrom. The activation procedure is hereafter described as to the impregnated precursor composition (A) and wherein the precursor composition is diluted with the carrier material (B).

A. Activation of Impregnated Precursor Composition

The activation is conducted in at least two stages. In the first stage the precursor composition, impregnated in the silica, is reacted with, and partially reduced by, enough activator compound so as to provide a partially activated precursor composition which has an activator compound/Ti molar ratio of about >0 to <10:1 and preferably of about 4 to about 8:1. This partial reduction reaction is preferably carried out in a hydrocarbon solvent slurry followed by drying of the resulting mixture, to remove the solvent, at temperatures between 20 to 80, and preferably of 50° to 70° C. In this partial activation procedure the activator compound may be used while absorbed on the carrier material used as the support for the precursor composition. The resulting product is a free-flowing solid particulate material which can be readily fed to the polymerization reactor. The partially activated and impregnated precursor composition, however, is at best, weakly active, as a polymerization catalyst in the polymerization process described herein. In order to render the partially activated and impregnated precursor composition active for ethylene polymerization purposes, additional activator compound must also be added to the polymerization reactor to complete, in the reactor, the activation of the precursor composition. The additional activator compound and the partially activated impregnated precursor composition are preferably fed to the reactor through separate feed lines. The additional activator compound may be sprayed into the reactor in the form of a solution thereof in a hydrocarbon solvent such as isopentane, hexane, or mineral oil. This solution usually contains about 2 to 30 weight percent of the activator compound. The additional activator compound is added to the reactor in such amounts as to provide, in the reactor, with the amounts of activator compound and titanium compound fed with the partially activated and impregnated precursor composition, a total Al/Ti molar ratio of $\geq 10$ to 400 and preferable of about 15 to 60. The additional amounts of activator compound added to the reactor, react with, and complete the activation of, the titanium compound in the reactor.

B. Activation where Precursor is Diluted with Carrier Material

Two procedures have been developed to accomplish this result. In one procedure, the precursor composition is completely activated, outside the reactor, in the absence of solvent, by dry blending the precursor composition with the activator compound. In this dry blending procedure the activator compound is preferably used while absorbed on a carrier material. This procedure has a disadvantage, however, in that the resulting dry, fully activated catalyst is pyrophoric where it contains >10 weight percent of the activator compound.

In the second, and preferred, of such catalyst activation procedures, the precursor composition is partially activated outside the polymerization reactor with activator compound in a hydrocarbon slurry, the hydrocarbon solvent is removed by drying and the partially activated precursor composition is fed to the polymerization reactor where the activation is completed with additional activator compound.

Thus, in the dry blending catalyst making procedure the solid particulate precursor composition is added to and evenly blended with solid particles of porous carrier material wherein the activator compound is absorbed. The activator compound is absorbed on the carrier material, from a hydrocarbon solvent solution of the activator compound, so as to provide a loading of about 10 to 50 weight percent of activator compound on 90 to 50 weight percent of carrier material. The amounts of the precursor composition, activator compound and carrier material that are employed are such as to provide the desired Al/Ti molar ratios and to provide a final composition having a weight ratio of precursor composition to carrier material of less than about 0.50, and preferably of less than about 0.33. This amount of carrier material thus provides the necessary dilution therewith of the activated catalyst so as to provide the desired control of the polymerization activity of the catalyst in the reactor. Where the final compositions contain about $\geq 10$ weight percent of the activator compound, they will be pyrophoric. During the dry blending operation, which may be conducted at ambient (25° C.) or lower temperatures, the dry mixture is well agitated to avoid any heat build-up during the ensuing reduction reaction which is exothermic, initially. The resulting catalyst is thus completely reduced and activated and can be fed to, and used as such in, the polymerization reactor. It is a free-flowing particulate material.

In the second, and preferred catalyst activation procedure, the activation is conducted in at least two stages. In the first stage the solid particulate precursor composition, diluted with carrier material, is reacted with and partially reduced by enough activator compound so as to provide a partially activated precursor composition which has an activator compound/Ti molar ratio of about 1 to 10:1 and preferably of about 4 to 8:1. This partial reduction reaction is preferably carried out in a hydrocarbon solvent slurry followed by drying of the resulting mixture to remove the solvent, at temperatures between 20 to 80, and preferably of 50° to 70° C. In this partial activation procedure the activator compound may be used while absorbed on the carrier material used to dilute the activator compound. The resulting product is a free-flowing solid particulate material which can be readily fed to the polymerization reactor. The partially activated precursor composition, however, is, at best, weakly active as a polymerization catalyst in the polymerization process described herein. In order to render the partially activated precursor composition active for ethylene polymerization purposes, additional activator compound must also be added to the polymerization reactor to complete, in the reactor, the activation of the precursor composition. The additional activator compound and the partially activated precursor composition are preferably fed to the reactor through separate feed lines. The additional activator compound may be sprayed into the reactor in the form of a solution thereof in a hydrocarbon solvent such as isopentane, hexane, or mineral oil. This solution usually contains about 2 to 30 weight percent of the activator compound. The activator compound may also be added to the reactor in solid form, by being absorbed on a carrier material. The carrier material usually contains 10 to 50 weight percent of the activator for this purpose. The additional activator compound is added to the reactor in such amounts as to provide, in the reactor, with the amounts of activator compound and titanium compound fed with the partially activated precursor composition, a total Al/Ti molar ratio of about 10 to 400 and preferably of about 15 to 60. The additional amounts of activator compound added to the reactor, react with, and complete the activation of, the titanium compound in the reactor.

In a continuous gas phase process, such as the fluid bed process disclosed below, discrete portions of the partially or completely activated precursor composition or discrete portions of the partially activated precursor composition impregnated on the support are continuously fed to the reactor, with discrete portions of any additional activation of the partially activated precursor composition, during the continuing polymerization process in order to replace active catalyst sites that are expended during the course of the reaction.

The Polymerization Reaction

The polymerization reaction is conducted by contacting a stream of the monomer(s), in a gas phase process, such as in the fluid bed process described below, and substantially in the absence of catalyst poisons such as moisture, oxygen, CO, $CO_2$, and acetylene with a catalytically effective amount of the completely activated precursor composition (the catalyst) which may be impregnated on a support at a temperature and at a pressure sufficient to initiate the polymerization reaction.

In order to achieve the desired density ranges in the copolymers it is necessary to copolymerize enough of the $\geq C_3$ comonomers with ethylene to achieve a level of $>0$ to about 10 mol percent of the $C_3$ to $C_8$ comonomer in the copolymer. The amount of comonomer needed to achieve this result will depend on the particular comonomer(s) employed.

There is provided below a listing of the amounts, in mols, of various comonomers that are copolymerized with ethylene in order to provide polymers having the desired density range at any given melt index. The listing also indicates the relative molar concentration, of such comonomers to ethylene, which are to be present in the recycled gas stream of monomers under reaction equilibrium conditions in the reactor.

| $C_x$ comonomer | $C_x/C_2$ mol Ratio in gas phase at equilibrium | $C_x/C_2$ mol Ratio in polymer |
| --- | --- | --- |
| propylene | 0.2 to 0.9 | 0.01 to 0.09 |
| butene-1 | 0.1 to 0.5 | 0.006 to 0.08 |
| pentene-1 | 0.05 to 0.2 | 0.005 to 0.07 |
| hexene-1 | 0.02 to 0.15 | 0.004 to 0.06 |
| 4-methyl-pentene-1 | 0.02 to 0.15 | 0.004 to 0.06 |
| heptene-1 | 0.017 to 0.10 | 0.003 to 0.04 |
| octene-1 | 0.015 to 0.08 | 0.003 to 0.04 |

Gas ratios higher than those needed in the gas phase are fed to the reactor to maintain such ratios during the reaction.

Figure 4:
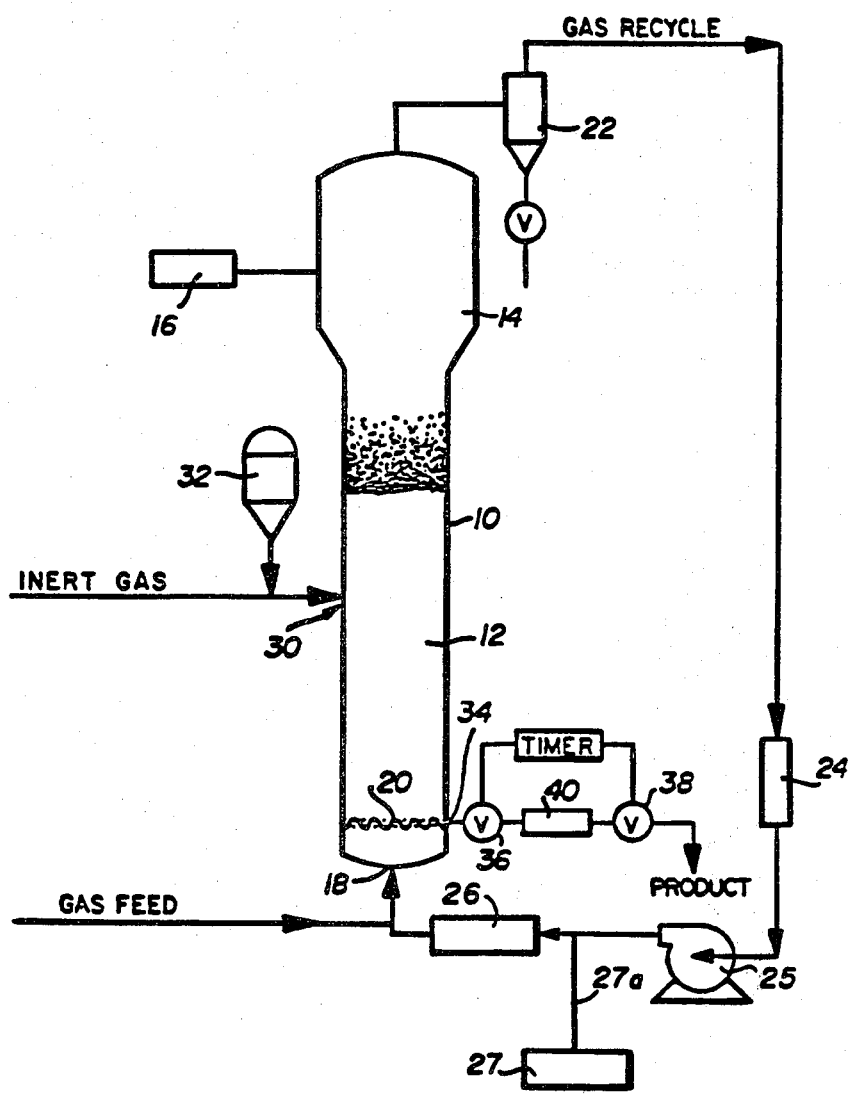
FIG. 4 shows a fluid bed reactor in which the low pressure ethylene polymers may be prepared.

A fluidized bed reaction system which can be used to produce the polymers used in the process of the present invention is illustrated in FIG. 4. With reference thereto the reactor 10 consists of a reaction zone 12 and a velocity reduction zone 14.

The reaction zone 12 comprises a bed of growing polymer particles, formed polymer particles and a minor amount of catalyst particles fluidized by the continuous flow of polymerizable and modifying gaseous components in the form of make-up feed and recycle gas through the reaction zone. To maintain a viable fluidized bed, the mass gas flow rate through the bed must be above the minimum flow-required for fluidization, and preferably from about 1.5 to about 10 times $G_{mf}$ and more preferably from about 3 to about 6 times $G_{mf}$. $G_{mf}$ is used in the accepted form as the abbreviation for the minimum mass gas flow required to achieve fluidization, C. Y. Wen and Y. H. Yu, "Mechanics of Fluidization", Chemical Engineering Progress Symposium Series, Vol. 62, p. 100–111 (1966).

It is essential that the bed always contains particles to prevent the formation of localized "hot spots" and to entrap and distribute the particulate catalyst throughout the reaction zone. On start up, the reaction zone is usually charged with a base of particulate polymer particles before gas flow is initiated. Such particles may be identical in nature to the polymer to be formed or different therefrom. When different, they are withdrawn with the desired formed polymer particles as the first product. Eventually, a fluidized bed of the desired polymer particles supplants the start-up bed.

The partially or completely activated precursor compound (the catalyst) used in the fluidized bed is preferably stored for service in a reservoir 32 under a blanket of a gas which is inert to the stored material, such as nitrogen and argon.

Fluidization is achieved by a high rate of gas recycle to and through the bed, typically in the order of about 50 times the rate of feed of make-up gas. The fluidized bed has the general appearance of a dense mass of viable particles in possible free-vortex flow as created by the percolation of gas through the bed. The pressure drop through the bed is equal to or slightly greater than the mass of the bed divided by the cross-sectional area. It is thus dependent on the geometry of the reactor.

Make-up gas is fed to the bed at a rate equal to the rate at which particulate polymer product is withdrawn. The composition of the make-up gas is determined by a gas analyzer 16 positioned above the bed. The gas analyzer determines the composition of the gas being recycled and the composition of the make-up gas is adjusted accordingly to maintain an essentially steady state gaseous composition within the reaction zone.

To insure complete fluidization, the recycle gas and, where desired, part of the make-up gas are returned to the reactor at point 18 below the bed. There exists a gas distribution plate 20 above the point of return to aid fluidizing the bed.

The portion of the gas stream which does not react in the bed constitutes the recycle gas which is removed from the polymerization zone, preferably by passing it into a velocity reduction zone 14 above the bed where entrained particles are given an opportunity to drop back into the bed. Particle return may be aided by a cyclone 22 which may be part of the velocity reduction zone or exterior thereto. Where desired, the recycle gas may then be passed through a filter 24 designed to remove small particles at high gas flow rates to prevent dust from contacting heat transfer surfaces and compressor blades.

The recycle gas is then compressed in a compressor 25 and then passed through a heat exchanger 26 wherein it is stripped of heat of reaction before it is returned to the bed. By constantly removing heat of reaction, no noticeable temperature gradient appears to exist within the upper portion of the bed. A temperature gradient will exist in the bottom of the bed in a layer of about 6 to 12 inches, between the temperature of the inlet gas and the temperature of the remainder of the bed. Thus, it has been observed that the bed acts to almost immediately adjust the temperature of the recycle gas above this bottom layer of the bed zone to make it conform to the temperature of the remainder of the bed thereby maintaining itself at an essentially constant temperature under steady state conditions. The recycle is then returned to the reactor at its base 18 and to the fluidized bed through distribution plate 20. The compressor 25 can also be placed upstream of the heat exchanger 26.

The monomers are fed into the reactor through gas inlet 18. To avoid condensation of the $C_5$–$C_8$ comonomers, in particular, in the reaction system it is desirable, when such $C_5$–$C_8$ comonomers are used in the gas mixture, to maintain the temperature of the gas mixture in the reaction system above the dew point of such mixture. This is primarily done by maintaining the temperature of the gas mixture at least about 3° to 10° C. above the dew point of the gas mixture. This may be done by adjusting the temperature of the cooling medium in heat exchanger 26. Any of the $C_5$ to $C_8$, in particular, comonomers that may condense out on the cooling surfaces of heat exchanger 26 are readily revaporized by contact with a portion or all of the recycled gas stream which is maintained at a temperature above the dew point.

The distribution plate 20 plays an important role in the operation of the reactor. The fluidized bed contains growing and formed particulate polymer particles as well as catalyst particles. As the polymer particles are hot and possible active, they must be prevented from settling, for if a quiescent mass is allowed to exist, any active catalyst contained therein may continue to react and cause fusion. Diffusing recycle gas through the bed at a rate sufficient to maintain fluidization at the base of the bed is, therefore, important. The distribution plate 20 serves this purpose and may be a screen, slotted plate, perforated plate, a plate of the bubble cap type, and the like. The elements of the plate may all be stationary, or the plate may be of the mobile type disclosed in U.S. Pat. No. 3,298,792. Whatever its design, it must diffuse the recycle gas through the particles at the base of the bed to keep them in a fluidized condition, and also serve to support a quiescent bed of resin particles when the reactor is not in operation. The mobile elements to the plate may be used to dislodge any polymer particles entrapped in or on the plate.

Hydrogen may be used as a chain transfer agent in the disclosed polymerization reaction. The ratio of hydrogen/ethylene employed will vary between about 0 to about 2.0 moles of hydrogen per mole of the monomer in the gas stream.

Any gas inert to the catalyst and reactants can also be present in the gas stream. The activator compound is preferably added to the reaction system at the hottest portion of the gas which is usually downstream from heat exchanger 26. Thus, the activator may be fed into the gas recycle system from dispenser 27 thru line 27A.

Compounds of the structure $Zn(R_a)(R_b)$, wherein $R_a$ and $R_b$ are the same or different $C_1$ to $C_{14}$ aliphatic or aromatic hydrocarbon radicals, may be used in conjunction with hydrogen, with the Ti-Mg catalysts of The Prior U.S. Applications as molecular weight control or chain transfer agents, that is, to increase the melt index values of the copolymers that are produced. About 0 to 50, and preferably about 20 to 30, mols of the Zn compound (as Zn) would be used in the gas stream in the reactor per mol of titanium compound (as Ti) in the reactor. The zinc compound would be introduced into the reactor preferably in the form of a dilute solution (2 to 30 weight percent) in hydrocarbon solvent or absorbed on a solid diluent material, such as silica, of the types described above, in amounts of about 10 to 50 weight percent. These compositions tend to be pyrophoric. The zinc compound may be added alone, or with any additional portions of the activator compound that are to be added to the reactor from a feeder, not shown, which could be positioned adjacent dispenser 27, near the hottest portion of the gas recycle system.

It is essential to operate the fluid bed reactor at a temperature below the sintering temperature of the polymer particles. To insure that sintering will not occur, operating temperatures below the sintering temperature are desired. For the production of the ethylene polymers in the polymerization process disclosed herein an operating temperature of about 30° to 115° C. is preferred, and a temperature of about 75° to 95° C. is most preferred. Temperatures of about 75° to 95° C. are used to prepare products having a density of about 0.91 to 0.92, and temperatures of about 80° to 100° C. are used to prepare products having a density of about >0.92 to 0.94, and temperatures of about 90° to 115° C. are used to prepare products having a density of >0.94.

The fluid bed reactor is operated at pressures of up to about 1000 psi, and is preferably operated at a pressure of from about 150 to 350 psi, with operation at the higher pressures in such ranges favoring heat transfer since an increase in pressure increases the unit volume heat capacity of the gas.

The partially or completely activated precursor composition is injected into the bed at a rate equal to its consumption at a point 30 which is above the distribution plate 20. Preferably, the catalyst is injected at a point located about ¼ to ¾ up the side of the bed. Injecting the catalyst at a point above the distribution plate is an important feature of this process. Since the catalysts disclosed herein are highly active, injection of the fully activated catalyst into the area below the distribution plate may cause polymerization to begin there and eventually cause plugging of the distribution plate. Injection into the viable bed, instead, aids in distributing the catalyst throughout the bed and tends to preclude the formation of localized spots of high catalyst concentration which may result in the formation of "hot spots".

A gas which is inert to the catalyst such as nitrogen or argon is used to carry the partially or completely reduced precursor composition, and any additional activator compound or non-gaseous chain transfer agent that is needed, into the bed.

The production rate of the bed is controlled by the rate of catalyst injection. The production rate may be increased by simply increasing the rate of catalyst injection and decreased by reducing the rate of catalyst injection.

Since any change in the rate of catalyst injection will change the rate of generation of the heat of reaction, the temperature of the recycle gas is adjusted upwards or downwards to accomodate the change in rate of heat generation. This insures the maintenance of an essentially constant temperature in the bed. Complete instrumentation of both the fluidized bed and the recycle gas cooling system, is, of course, necessary to detect any temperature change in the bed so as to enable the operator to make a suitable adjustment in the temperature of the recycle gas.

Under a given set of operating conditions, the fluidized bed is maintained at essentially a constant height by withdrawing a portion of the bed as product at a rate equal to the rate of formation of the particulate polymer product. Since the rate of heat generation is directly related to product formation, a measurement of the temperature rise of the gas across the reactor (the difference between inlet gas temperature and exit gas temperature) is determinative of the rate of particulate polymer formation at a constant gas velocity.

The particulate polymer product is preferably continuously withdrawn at a point 34 at or close to the distribution plate 20 and in suspension with a portion of the gas stream which is vented before the particles settle to preclude further polymerization and sintering when the particles reach their ultimate collection zone. The suspending gas may also be used to drive the product of one reactor to another reactor.

The particulate polymer product is conveniently and preferably withdrawn through the sequential operation of a pair of timed valves 36 and 38 defining a segregation zone 40. While valve 38 is closed, valve 36 is opened to emit a plug of gas and product to the zone 40 between it and valve 36 which is then closed. Valve 38 is then opened to deliver the product to an external recovery zone. Valve 38 is then closed to await the next product recovery operation.

Finally, the fluidized bed reactor is equipped with an adequate venting system to allow venting the bed during start up and shut down. The reactor does not require the use of stirring means and/or wall scraping means.

The catalyst systems disclosed herein appear to yield a fluid bed product having an average particle size between about 0.005 to about 0.06 inches and preferably about 0.02 to about 0.04 inches.

The feed stream of gaseous monomer, with or without inert gaseous diluents, is fed into the reactor at a space time yield of about 2 to 10 pounds/hour/cubic foot of bed volume.

The term virgin resin or polymer as used herein means polymer, in granular form, as it is recovered from the polymerization reactor.

Film

The film produced by the method of the present invention has a thickness of greater than about 0.10 mils to about 20 mils, preferably greater than about 0.10 to 10 mils, most preferably greater than about 0.10 to 4.0 mils. The 0.10 to 4.0 mil film is characterized by the following properties: a puncture resistance value of greater than about 7.0 in-lbs/mil; an ultimate elongation of greater than about 400%; a thermal shrinkage of less than 3% after heating to 105°–110° C. and cooling to room temperature; tensile impact strength of greater than about 500 to about 2000 ft-lbs/in$^3$ and tensile strength greater than about 2000 to about 7000 psi.

Various conventional additives such as slip agents, antiblocking agents, and antioxidants can be incorporated in the film in accordance with conventional practice.

Blown Film Extrusion

The films herein may be extruded by tubular blown film extrusion. In this process a narrow molecular weight distribution polymer is melt extruded through an extruder having an extrusion screw therein with a length to diameter ratio of between 15:1 to 21:1, preferably, 15:1 to 18:1, and most preferably 18:1. This extrusion screw contains a feed, transition and metering section. Optionally, the extrusion screw can contain a mixing section such as that described in U.S. Pat. Nos. 3,486,192; 3,730,492 and 3,756,574, the disclosures of which are incorporated herein by reference. Preferably, the mixing section is placed at the screw tip.

The extruder which may be used herein is a 24/1 Egan extruder. Conventionally this extruder contains an extrusion screw with a length to diameter ratio of 24:1. The extrusion screw of the present invention may be substituted directly for the 24/1 length to diameter extrusion screw. Alternatively, when, for example, an extrusion screw of a length to diameter ratio of 18/1 is used in place of the 24/1 extrusion screw, the remaining space in the extrusion barrel can be partially filled with various types of plugs, torpedoes, or static mixers to reduce residence time of the polymer melt. Also, the barrel of the extruder can be such so as to accomodate the 18/1 length to diameter extrusion screw directly.

Figure 5:
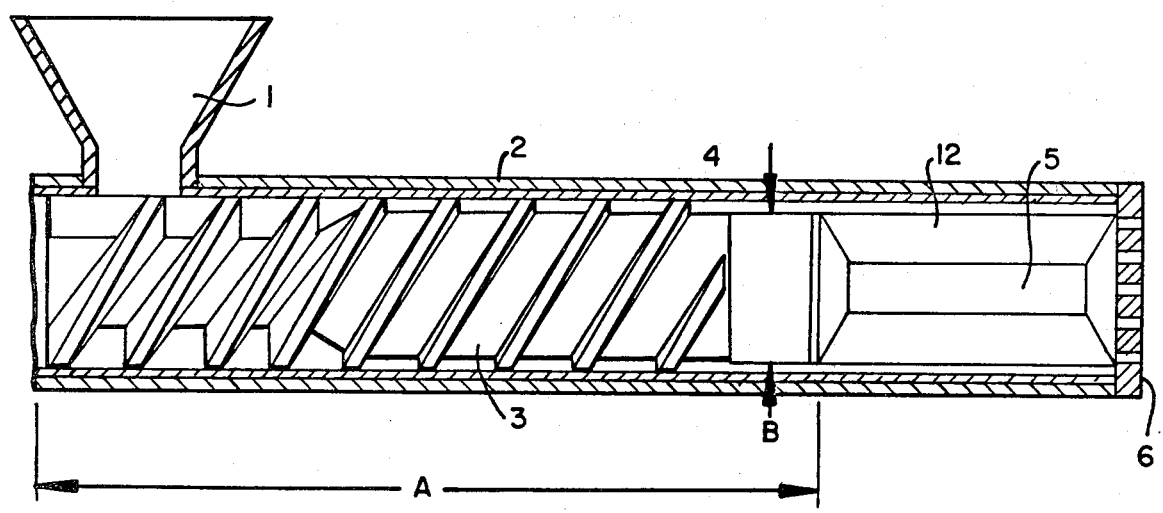
FIG. 5 shows a schematic illustration of an extruder barrel containing an extrusion screw of the present invention.

FIG. 5 shows a schematic illustration of an extruder barrel containing an extrusion screw which may be used in the process of the present invention. The barrel 2 of the extruder contains an extrusion screw 3, and has a mixing head 4. This extrusion screw has a length, A, and a diameter B. The length to diameter ratio of this extrusion screw is between about 15:1 to 21:1. Plug 7 in the barrel of the extruder contains a static mixer, 5. Hopper 1 and breather plate 6 are also shown.

The molten polymer may be extruded through an annular die having a die gap of greater than about 50 mils to less than about 120 mils, as described in U.S. patent application Ser. No. 892,324 filed Mar. 31, 1978, abandoned, and refiled on Feb. 16, 1979 as Ser. No. 012,795, now U.S. Pat. No. 4,243,619 in the names of W. A. Fraser et al and entitled A Process for Making Film From Low Density Ethylene Hydrocarbon Copolymer, and which corresponds to European patent application No. 79100954.1 which was published as Publication No. 006,110 on Jan. 9, 1980.

The polymer is extruded at a temperature of about 325° to about 500° F. The polymer is extruded in an upward vertical direction in the form of a tube although it can be extruded downward or even sideways. After extrusion of the molten polymer through the annular die, the tubular film is expanded to the desired extent, cooled, or allowed to cool and flattened. The tubular film is flattened by passing the film through a collapsing frame and a set of nip rolls. These nip rolls are driven, thereby providing means for withdrawing the tubular film away from the annular die.

A positive pressure of gas, for example, air or nitrogen, is maintained inside the tubular bubble. As is known in the operation of conventional film processes, the pressure of the gas is controlled to give the desired degree of expansion of the tubular film. The degree of expansion, as measured by the ratio of the fully expanded tube circumference to the circumference of the die annulus, is in the range 1/1 to 6/1 and preferably, 1/1 to 4/1. The tubular extrudate is cooled by conventional techniques such as, by air cooling, water quench or mandrel.

The drawdown characteristics of the polymers herein are excellent. Drawdown, defined as the ratio of the die gap to the product of film gauge and blow up ratio, is kept greater than about 2 to less than about 250 and preferably greater than about 25 to less than about 150. Very thin gauge films can be produced at high drawdown from these polymers even when said polymer is highly contaminated with foreign particles and/or gel. Thin gauge films greater than about 0.5 mils can be processes to exhibit ultimate elongations MD greater than about 400% to about 700% and TD greater than about 500% to about 700%. Furthermore, these films are not perceived as "splitty". "Splittiness" is a qualitative term which describes the notched tear response of a film at high deformation rates. "Splittiness" reflects crack propagation rate. It is an end use characteristic of certain types of film and is not well understood from a fundamentals perspective.

As the polymer exits the annular die, the extrudate cools and its temperature falls below its melting point and it solidifies. The optical properties of the extrudate change as crystallization occurs and a frost line is formed. The position of this frost line above the annular die is a measure of the cooling rate of the film. This cooling rate has a very marked effect on the optical properties of the film produced herein.

Slot Cast Film Extrusion

The films herein may also be extruded by slot cast film extrusion. This film extrusion method is well known in the art and comprises extruding a sheet of molten polymer through a slot die and then quenching the extrudate using, for example, a chilled casting roll or water bath. In the chill roll process, film may be extruded horizontally and laid on top of the chill roll or it may be extruded downward and drawn under the chill roll. Extrudate cooling rates in the slot cast process are very high. Chill roll or water bath quenching is so fast that as the extrudate cools below its melting point, crystallites nucleate very rapidly, supramolecular structures have little time to grow and spherulites are held to a very small size. The optical properties of slot cast film are vastly improved over those characterizing films using the slower cooling rate, tubular blown film extrusion process. Compound temperatures in the slot cast film extrusion process generally run much higher than those typifying the tubular blown film process. Melt strength is not a process limitation in this film extrusion method. Both shear viscosity and extensional viscosity are lowered. Film can generally be extruded at higher output rate, then practiced in the blown film process. The higher temperatures reduce shear stresses in the die and raise the output threshold for melt fracture.

In the slot case film extrusion of high pressure low density polyethylene, the strain hardening character of the high pressure low density polyethylene melt causes much molecular orientation to be developed in the film when extruded at high drawdown. Slot cast, high pressure low density polyethylene films can exhibit highly imbalanced mechanical properties. The narrow molecular weight distribution ethylene hydrocarbon copolymers employed in this invention, as discussed previously, exhibit reduced strain hardening behavior in the melt. As in the blown film process, these materials may be extruded at high drawdown, without the building in of excessive molecular orientation. The mechanical property balance of these films does not change significantly as drawdown is increased.

The properties of the polymers produced in the Examples were determined by the following test methods:

Density: For materials having a density of <0.940, ASTM-1505 procedure is used and plaque is conditioned for one hour at 100° C. to approach equilibrium crystallinity. For materials having a density of ≧0.940, a modified procedure is used wherein the test plaque is conditioned for one hour at 120° C. to approach equilibrium crystallinity and is then quickly cooled to room temperature. All density values are reported as grams/cm$^3$. All density measurements are made in a density gradient column.

Melt Index (MI): ASTM D-1238-Condition E-Measured at 190° C.-reported as grams per 10 minutes.

Flow Rate (HLMI): ASTM D-1238-Condition F-Measured at 10 times the weight used in the melt index test above.

Melt Flow Ratio (MFR)=Flow Rate/Melt Index productivity: a sample of the resin product is ashed, and the weight % of ash is determined; since the ash is essentially composed of the catalyst, the productivity is thus the pounds of polymer produced per pound of total catalyst consumed. The amount of Ti, Mg and halide in the ash are determined by elemental analysis.

n-hexane extractables: (FDA test used for polyethylene film intended for food contact applications). A 200 square inch sample of 1.5 mil gauge film is cut into strips measuring 1"×6" and weighed to the nearest 0.1 mg. The strips are placed in a vessel and extracted with 300 ml of n-hexane at 50°±1° C. for 2 hours. The extract is then decanted into tared culture dishes. After drying the extract in a vacuum desiccator, the culture dish is weighed to the nearest 0.1 mg. The extractables, normalized with respect to the original sample weight, is then reported as the weight fraction of n-hexane extractables.

bulk density: The resin is poured via $\frac{3}{8}$" diameter funnel into a 100 ml graduated cylinder to 100 ml line without shaking the cylinder, and weighed by difference.

Molecular Weight Distribution (Mw/Mn): Gel Permeation Chromatography For resins with density <0.94: Styrogel Packing: (Pore Size Sequence is $10^7$, $10^5$, $10^4$, $10^3$, 60 A°) Solvent is Perchloroethylene at 117° C. For resins with density <0.94: Styrogel Packing: (Pore Size Sequence is $10^7$, $10^6$, $10^5$, $10^4$, 60 A°) Solvent is ortho dichloro benzene at 135° C. Detection for all resins: Infra red at 3.45μ.

The following Examples are designed to illustrate the process of the present invention and are not intended as a limitation upon the scope thereof.

I. Preparation of Impregnated Precursor

In a 12 l flask equipped with a mechanical stirrer are placed 41.8 g (0.439 mol) anhydrous MgCl$_2$ and 2.5 l tetrahydrofuran (THF). To this mixture, 27.7 g (0.184 mol) TiCl$_4$ is added dropwise over $\frac{1}{2}$ hour. It may be necessary to heat the mixture to 60° C. for about $\frac{1}{2}$ hour in order to completely dissolve the material.

500 g of porous silica is added and the mixture stirred for $\frac{1}{4}$ hour. The mixture is dried with a N$_2$ purge at 60° C. for about 3–5 hours to provide a dry free flowing powder having the particle size of the silica. The absorbed precursor composition has the formula

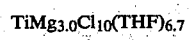

$TiMg_{3.0}Cl_{10}(THF)_{6.7}$

Ib. Preparation of Impregnated Precursor from Preformed Precursor Composition In a 12 liter flask equipped with a mechanical stirrer, 146 g of precursor composition is dissolved in 2.5 liters dry THF. The solution may be heated to 60° C. in order to facilitate dissolution. 500 g of porous silica is added and the mixture is stirred for ¼ hour. The mixture is dried with a N$_2$ purge at ≦60° C. for about 3–5 hours to provide a dry free flowing powder having the particle size of the silica.

The precursor composition employed in this Procedure Ib. is formed as in Procedure Ia. except that it is recovered from the solution thereof in THF by crystallization or precipitation.

The precursor composition may be analyzed at this point for Mg and Ti content since some of the Mg and/or Ti compound may have been lost during the isolation of the precursor composition. The empirical formulas used herein in reporting the precursor compositions are derived by assuming that the Mg and Ti still exist in the form of the compounds in which they were first added to the electron donor compound. The amount of electron donor is determined by chromatography.

II. Activation Procedure

The desired weights of impregnated precursor composition and activator compound are added to a mixing tank with sufficient amounts of anhydrous aliphatic hydrocarbon diluent such as isopentane to provide a slurry system.

The activator compound and precursor compound are used in such amounts as to provide a partially activated precursor composition which has an Al/Ti ratio of >0 to ≦10:1 and preferably of 4 to 8:1.

The contents of the slurry system are then thoroughly mixed at room temperature and at a atmospheric pressure for about ¼ to ½ hour. The resulting slurry is then dried under a purge of dry inert gas such as nitrogen or argon, at atmospheric pressure and at a temperature of 65°±10° C. to remove the hydrocarbon diluent. This process usually requires about 3 to 5 hours. The resulting catalyst is in the form of a partially activated precursor composition which is impregnated within the pores of the silica. The material is a free flowing particulate material having the size and shape of the silica. It is not pyrophoric unless the aluminum alkyl content exceeds a loading of 10 weight percent. It is stored under a dry inert gas such as nitrogen or argon prior to future use. It is now ready for use by being injected into, and fully activated within, the polymerization reactor.

When additional activator compound is fed to the polymerization reactor for the purpose of completing the activation of the precursor composition, it is fed into the reactor as a dilute solution in a hydrocarbon solvent such as isopentane. These dilute solutions contain about 5 to 30% by volume of the activator compound.

The activator compound is added to the polymerization reactor so as to maintain the Al/Ti ratio in the reactor at a level of about ≧10 to 400:1 and preferably of 15 to 60:1.

III. Preparation of Precursor Composition

In a 5 liter flask equipped with a mechanical stirrer, 16.0 g (0.168 Mol) of anhydrous MgCl$_2$ was mixed with 850 ml of pure tetrahydrofuran under nitrogen. The mixture was stirred at room temperature (~25° C.) while 13.05 g (0.069 Mol) of TiCl$_4$ was added dropwise. After complete addition, the contents of the flask were heated to reflux for about ½ to 1 hour to dissolve the solids. The system was cooled to room temperature and 3 liters of pure n-hexane was slowly added over a period of ¼ hour. A yellow solid precipitated. The supernatant liquid was decanted and the solids were washed 3× with one liter of n-hexane. The solids were filtered and dried in a rotating evaporating flask at 40°–60° C. to give 55 g of solid precursor composition.

The precursor composition may be analyzed at this point for Mg and Ti content since some of the Mg and/or Ti compound may have been lost during the isolation of the precursor composition. The empirical formulas used herein in reporting these precursor compositions are derived by assuming that the Mg and the Ti still exist in the form of the compounds in which they were first added to the electron donor compound and that all other residual weight in the precursor composition is due to the electron donor compound.

Analysis of the solid showed the following: Mg:6.1%; Ti:4.9%; which corresponds to TiMg$_{2.45}$Cl$_{8.9}$(THF)$_{7.0}$. THF means tetrahydrofuran.

IV. Activation Procedures

Procedure A.—This procedure relates to a multistep activation of the precursor composition. In this procedure the activation is conducted in such a way that the precursor composition is only partially reduced prior to the introduction thereof into the polymerization reactor, and then the remainder of the reduction process is completed within such reactor.

The desired weight of dry inert carrier material is charged to a mixing vessel or tank. For the examples described herein the amount of inert carrier is about 500 grams for silica and about 1000 grams for a polyethylene carrier. The inert carrier material is then admixed with sufficient amounts of anhydrous, aliphatic hydrocarbon diluent such as isopentane to provide a slurry system. This usually requires about 4 to 7 ml of diluent per gram of inert carrier. The desired weight of the precursor composition is then charged to the mixing vessel and thoroughly admixed with the slurry composition. The amount of precursor composition used in this procedure for making the catalysts in these examples is about 80 to 135 grams, with such precursor composition having an elemental titanium content of 1±0.1 millimole of Ti per gram of precursor composition.

The desired amount of activator compound needed to partially activate the precursor composition is added to the contents of the mixing vessel so as to partially activate the precursor composition. The amount of activator compound used in this regard provides an Al/Ti ratio in the partially reduced precursor composition of >0 to <10:1 and preferably of 4 to 8:1. The activator compound is added to the mixing tank in the form of a solution which contains about 20 weight percent of the activator compound (triethyl aluminum in these examples) in an inert aliphatic hydrocarbon solvent (hexane in these examples). The activation is accomplished by thoroughly mixing and contacting the activator compound with the precursor composition. All of the operations described above are conducted at room temperature, and at atmospheric pressure in an inert atmosphere.

The resulting slurry is then dried under a purge of dry inert gas such as nitrogen or argon, at atmospheric pressure at a temperature of ≦60° C. to remove the hydrocarbon diluent. This process usually requires about 3 to 5 hours. The resulting product is in the form of a dry free-flowing particulate material wherein the activated precursor composition is uniformly blended with the inert carrier. The dried non-pyrophoric product is stored under an inert gas.

Where additional activator compound is fed to the polymerization reactor in this Procedure A for the purposes of completing the activation of the precursor composition, it may be first absorbed on an inert carrier material such as silica or polyethylene, or, most preferably, it may be injected into the reaction zone as a dilute solution in a hydrocarbon solvent such as isopentane.

Where the activator compound is to be absorbed on a silica support, the two materials are mixed in a vessel containing about 4 ml of isopentane per gram of carrier material. The resulting slurry is then dried for about 3 to 5 hours under a purge of nitrogen at atmospheric pressure at a temperature of 65°±10° C. to remove the hydrocarbon diluent.

Where the activator compound is to be injected into the polymerization reaction system as a dilute solution, concentrations of about 5 to 10% by weight are preferred.

Regardless of the method used to introduce the activator compound into the polymerization reactor for the purposes of completing the activation of the precursor composition, it is added at a rate such as to maintain the Al/Ti ratio in the polymerization reactor at a level of ≧10 to 400:1 and preferably of ≧10 to 100:1.

Prior to being used herein, the silicas are dried at ≧600° C. for ≧4 hours.

Procedure B—In this procedure a complete activation of the precursor composition is accomplished by blending the precursor composition with, and thereby contacting it with, the activator compound which is absorbed on an inert carrier material.

The activator compound is absorbed on the inert carrier material by being slurried with the carrier material in an inert hydrocarbon solvent and by then drying the slurry to remove the solvent so as to provide a composition containing about 10 to 50 weight percent of activator compound. Thus, 500 grams of silica which has been previously dehydrated (at 800° C. for 4 hours) is charged to a mixing vessel. The desired amount of activator compound, as a 20 weight percent solution in hydrocarbon solvent, such as hexane, is then added to the mixing vessel and mixed (slurried) with the inert carrier at room temperature and atmospheric pressure. The solvent is then removed by drying the resulting slurry at 65°±10° C. for about 3 to 5 hours at atmospheric pressure under a flowing stream of dry inert gas such as nitrogen. The dried composition is in the form of free flowing particles having the size of the carrier material.

About 500 grams of the dried silica supported activator compound (50/50 weight percent of silica/activator compound) is then added to a mixing vessel. The desired weight of precursor composition (80–100 grams) is also added to the mixing vessel. The materials are then thoroughly mixed for about 1 to 3 hours at room temperature at atmospheric pressure under a dry inert gas such as nitrogen or argon. The resulting composition is in the form of a physical admixture of dry free-flowing particles having a size of the order of 10 to 150 microns. During the admixing operation the supported activator compound comes into contact with the precursor composition and completely activates it. During the resulting exothermic reaction the temperature of the catalyst composition should not be allowed to exceed 50° C. so as to avoid any significant deactivation of the catalyst. The resulting activated composition has an Al/Ti ratio of about 10 to 50 and may be pyrophoric where it contains >10 weight percent of the activator compound. It is stored under a dry inert gas such as nitrogen or argon prior to being injected into the reactor.

EXAMPLE 1

Preparation of Copolymer

Ethylene was copolymerized with propylene or butene-1 (propylene in Runs 1 and 2 and butene-1 in Runs 3 to 14) in each of this series with catalyst formed as described above and as activated by Activation Procedure A to produce polymers having a density of ≦0.940. In each case, the partially activated precursor composition had an Al/Ti mol ratio of 4.4 to 5.8. The completion of the activation of the precursor composition in the polymerization reactor was accomplished with triethyl aluminum (as a 5 weight % solution in isopentane in Runs 1 to 3 and 4 to 14, and adsorbed on silica, 50/50 weight %, in Runs 4 and 5 so as to provide the completely activated catalyst in the reactor with an Al/Ti mol ratio of about 29 to 140.

Each of the polymerization reactions was continuously conducted for >1 hour after equilibrium was reached and under a pressure of about 300 psig and a gas velocity of about 5 to 6 times $G_{mf}$ in a fluid bed reactor system at a space time yield of about 3 to 6 lbs/hr/ft$^3$ of bed space. The reaction system was as described in the drawing above. It has a lower section 10 feet high and 13½ inches in (inner) diameter, and an upper section which was 16 feet high and 23½ inches in (inner) diameter.

In several of the Runs zinc diethyl was added during the reaction (as a 2.6 weight % solution in isopentane) to maintain a constant Zn/Ti mol ratio where the zinc diethyl was used, the triethyl aluminum was also added as a 2.6 weight percent in isopentane.

Table A below lists, with respect to Runs 1 to 14 various operating conditions employed in such examples i.e., the weight percent of precursor composition in the blend of silica and precursor composition; Al/Ti ratio in the partially activated precursor composition; Al/Ti ratio maintained in the reactor; polymerization temperature; percent by volume of ethylene in reactor; H$_2$/ethylene mol ratio; comonomer (C$_x$)/C$_2$ mol ratio in reactor; catalyst productivity and Zn/Ti mol ratio. Table B below lists properties of the granular virgin resins made in runs 1 to 14, i.e., density; melt index (M.I.); melt flow ratio (MFR); weight percent ash; Ti content (ppm), bulk density and average particle size.

TABLE A

| | Reaction Conditions For Runs 1 to 14 | | | | | | |
|---|---|---|---|---|---|---|---|
| Run No | Weight % precursor | Al/Ti ratio in part. act. precursor | Al/Ti ratio in reactor | Temp °C. | Vol % C$_2$ | H$_2$/C$_2$ mol ratio | C$_x$/C$_2$ mol ratio |
| 1 | 8.3 | 5.8 | 40.5 | 90 | 41.7 | 0.492 | 0.486 |
| 2 | 8.3 | 5.8 | 50.8 | 90 | 39.7 | 0.566 | 0.534 |
| 3 | 20.1 | 4.50 | 88.3 | 85 | 56.3 | 0.148 | 0.450 |
| 4 | 19.8 | 4.40 | 26.7 | 85 | 50.2 | 0.350 | 0.350 |
| 5 | 19.8 | 4.40 | 26.7 | 80 | 54.1 | 0.157 | 0.407 |
| 6 | 6.9 | 5.08 | 42.0 | 85 | 49.2 | 0.209 | 0.480 |
| 7 | 6.9 | 5.08 | 33.6 | 85 | 46.5 | 0.208 | 0.482 |
| 8 | 6.9 | 5.08 | 28.8 | 85 | 42.1 | 0.206 | 0.515 |

TABLE A-continued

Reaction Conditions For Runs 1 to 14

| Run No | Weight % precursor | Al/Ti ratio in part. act precursor | Al/Ti ratio in reactor | Temp °C. | Vol % C$_2$ | H$_2$/C$_2$ mol ratio | C$_x$/C$_2$ mol ratio |
|---|---|---|---|---|---|---|---|
| 10 | 8.3 | 5.8 | 124.6 | 90 | 45.1 | 0.456 | 0.390 |
| 11 | 8.3 | 5.8 | 80.8  | 90 | 42.7 | 0.365 | 0.396 |
| 12 | 8.3 | 5.8 | 52.0  | 90 | 48.4 | 0.350 | 0.397 |
| 13 | 8.3 | 5.8 | 140.1 | 90 | 42.6 | 0.518 | 0.393 |
| 14 | 8.3 | 5.8 | 63.5  | 90 | 40.8 | 0.556 | 0.391 |

TABLE B

Properties of Polymers Made in Runs 1 to 14

| Run No | Density | M.I. | MFR | bulk density | average particle size, inches |
|---|---|---|---|---|---|
| 1  | 0.927 | 22.0 | 24.4 | 16.8 | 0.0230 |
| 2  | 0.929 | 24.0 | 23.4 | 17.5 | 0.0230 |
| 3  | 0.925 | 0.61 | 27.1 | 16.8 | 0.0300 |
| 4  | 0.931 | 12.0 | 26.7 | 16.8 | 0.0275 |
| 5  | 0.923 | 1.47 | 28.2 | 15.6 | 0.0404 |
| 6  | 0.919 | 3.41 | 25.9 | 16.8 | 0.0550 |
| 7  | 0.925 | 2.90 | 24.5 | 17.5 | 0.0590 |
| 8  | 0.919 | 3.10 | 24.6 | 16.2 | 0.0570 |
| 10 | 0.929 | 16.0 | 24.1 | 17.3 | 0.0230 |
| 11 | 0.929 | 15.3 | 24.0 | 16.6 | 0.0234 |
| 12 | 0.928 | 11.5 | 24.1 | 16.7 | 0.0248 |
| 13 | 0.929 | 20.7 | 24.3 | 17.3 | 0.0258 |
| 14 | 0.929 | 29.2 | 26.1 | 16.8 | 0.0206 |

EXAMPLE 2

An ethylene-butene copolymer prepared as in Example 1 and having a density of 0.920 and a melt index of 2.0 was formed into film of 1.5 gauge, by blown film extrusion using a 2½ inch diameter, 18:1 L/D extrusion screw in a 24/1 extruder. The extrusion screw had a feed section of 12.5 inches, transition section of 7.5 inches, a metering section of 20 inches, and a mixing section of 5 inches. The mixing section was a fluted mixing section with the following characteristics: a diameter of 2.5 inches; 3.0 channels; channel radius of 0.541 inches; mixing barrier land width of 0.25 inches; cleaning barrier land width of 0.20 inches; and a mixing barrier length of 4.5 inches. The void in the barrel was filled by a plug 2.496 inches in diameter, 11.0 inches long which contained a static mixer 9.0 inches long and 1.0 inch in diameter.

The barrel temperature of the extruder was about 350° F. Also, a 20/60/20 mesh screen pack and a six inch diameter, spiral pin, blown film extrusion die were used. The die temperature was about 350° F. Output rate was 48 lbs/hour. Nip roll height was approximately 15 ft. Cooling was accomplished with a Venturi type air ring. All films were prepared at a 2:1 blow up ratio (ratio of bubble circumference to die circumference). The revolution per minute (RPM) of the extrusion screw; pounds per hour per RPM, shaft horsepower, horsepower-hour/pound, and extrudate temperature are as set forth in Table I.

EXAMPLE 3

The procedure of Example 2 was exactly repeated except that the output rate was 70 lbs/hour. The results are set forth in Table I.

EXAMPLE 4

The procedure of Example 2 was exactly repeated except that the output rate was 96 lbs/hr. The results are set forth in Table I.

TABLE I

| Example | 2 | 3 | 4 |
|---|---|---|---|
| Output (lbs/hr) | 48 | 70 | 96 |
| RPM | 30 | 44 | 60 |
| lbs/hr/RPM | 1.6 | 1.6 | 1.6 |
| Shaft HP | 3.2 | 5.7 | 8.8 |
| hp-hr/lb(efficiency) | 0.067 | 0.081 | 0.092 |
| Temp. °F. | 385 | 410 | 428 |

EXAMPLE 5

The procedure of Example 2 was exactly repeated except that output was 70 lbs per hour and an extrusion screw having an L/D ratio of 24:1 was used in place of the 18:1 L/D extrusion screw. The results of using this output rate and extrusion screw are compared with Example 3 wherein an output rate of 70 lbs per hour and an extrusion screw having an L/D ratio of 18:1 is used. The results are set forth in Table II.

TABLE II

| Example | 3 | 5 |
|---|---|---|
| L/D ratio of extrusion screw | 18:1 | 24:1 |
| Output (lbs/hr) | 70 | 70 |
| RPM | 44 | 41 |
| lbs/hr/RPM | 1.60 | 1.65 |
| Shaft HP | 5.88 | 6.31 |
| hp-hr/lb (efficiency) | 0.083 | 0.092 |
| Temp (°F.) | 430 | 455 |

The data of Table II show the advantages of using an 18/1 L/D extrusion screw, i.e., lower power requirements at the same output rate, more efficient use of power (as shown by the lower value of hp-hr/lb) and lower extrudate temperature.

RAPID MELTING PHENOMENA IN EXTRUDERS

Shear melting mechanism is accepted as the melting mechanism for all crystalline and glasslike thermoplastic polymer.

The shear melting phenomena can be described as a thin film heat generation mechanism which operates between the unmelted solid polymer and the barrel of the extruder. The film which forms on the channel of the extruder is generally 15–20 mils (0.015–0.020 inches) thick and shear rates up to 5000 seconds$^{-1}$ can be generated in the thin melt film. As the channel progresses towards the exit of the extruder the amount of solid polymer in the channel decreases due to the heating and melting in the thin film undergoing shear. With high pressure polyethylene this melting occurs over 50–80% of the length of the extruder. With the polymers described in this patent application the slow melting mechanism of high pressure polyethylene resins was not observed in a series of tests which will be described below.

The melting mechanism observed with the polymers described herein was much more rapid in that it occurred in less than 40% of the length of the screw (having a length to diameter ratio of 15:1 to 21:1) and in as little as 2–5 screw diameters from the start of melting in some cases.

The differences between this rapid melting phenomena and the melting phenomena of high pressure polyethylene resins are threefold:
1. Much more rapid melting.
2. Melting is not confined to a thin film between the solid polymer and the barrel.
3. The melt tends to form on the trailing edge instead of the leading edge of the flights of the extruder screw.

The melting mechanism described herein as a rapid melting phenomena has been shown to be operative with pellets or granular feeds.

The rapid melting phenomena is responsible for the ability of the short screw to produce quality melts at short lengths at high extrusion rates in film operation. Quality, i.e., temperature uniformity, is necessary for film extrusion. Conditioning of the melt is necessary for temperature uniformity. This conditioning in the case of the short screw is accomplished by the rapid melting and conditioning the melt for the remaining length.

METHOD OF DETERMINING THE MELTING RATE

A 2.5 inch extruder is used with the ability to cool and heat the barrel rapidly, that is, heating to 150° C. at the rate of about 10° C. per minute and cooling from 150° C. to room temperature ($\sim$25° C.) at the rate of about 15° C. per minute. Cooling is done by a cooling channel embedded in the extruder barrel which can be programmed to run cool water through continuously. High intensity heaters are used in combination with steam in the cooling channel to provide rapid heating.

A large air cylinder is placed on the back of the extruder and is used to apply large forces to the extruder screw (about 80 psi applied to a 12" ram which corresponds to a total force of about four (4) tons).

The rapidity of melting is determined by freezing the molten polymer in the barrel of the extruder and pushing-out the thus frozen sample (a "pushout").

The method of obtaining the pushout is to run the extruder full of polymer at the desired conditions (i.e. 60 RPM and 300° F. barrel temperature) then suddenly turn on the cooling water and decrease the screw speed to zero RPM. Cooling is continued until the barrel is at room temperature. After waiting until the polymer reaches room temperature, which usually takes $\geq$4 hours, electrical heat and steam are applied to the barrel to quickly loosen the plug and a large force is then applied to the screw during the heating. After an interval of 3–10 minutes, the screw is pushed out of the extruder with force applied to the back of the screw after melting as little of the polymer as possible at the barrel surface. When the screw is out, the solid plug of polymer is unwrapped from the screw and sectioned as a function of the screw length to diameter ratio to determine the relative amount of unmelted polymer vis-a-vis melted polymer for the extrusion conditions existing at the time of cooling.

A rapid melting polymer then is one which, when passed through an extruder as indicated above, will have completely melted within 2 to 5 screw diameters from the start of melting.

SLOW SHEAR THINNING

By slow shear thinning it is meant that when the shear rate of the test polymer is measured in a capillary plastometer at 400° F. in the range of shear rates of from 1 second$^{-1}$ to 5000 seconds$^{-1}$, the viscosity of the test polymer, when measured in pounds$_F$-seconds/inch$^2$ (lb$_F$-sec/in$^2$), drops consistently over the test range but is always greater than that of a high pressure ethylene homopolymer having the same density ($\pm$0.005 grams per cubic centimeter) and melt index ($\pm$0.3 grams per 10 minutes) values over the entire test range.

Figure 6:
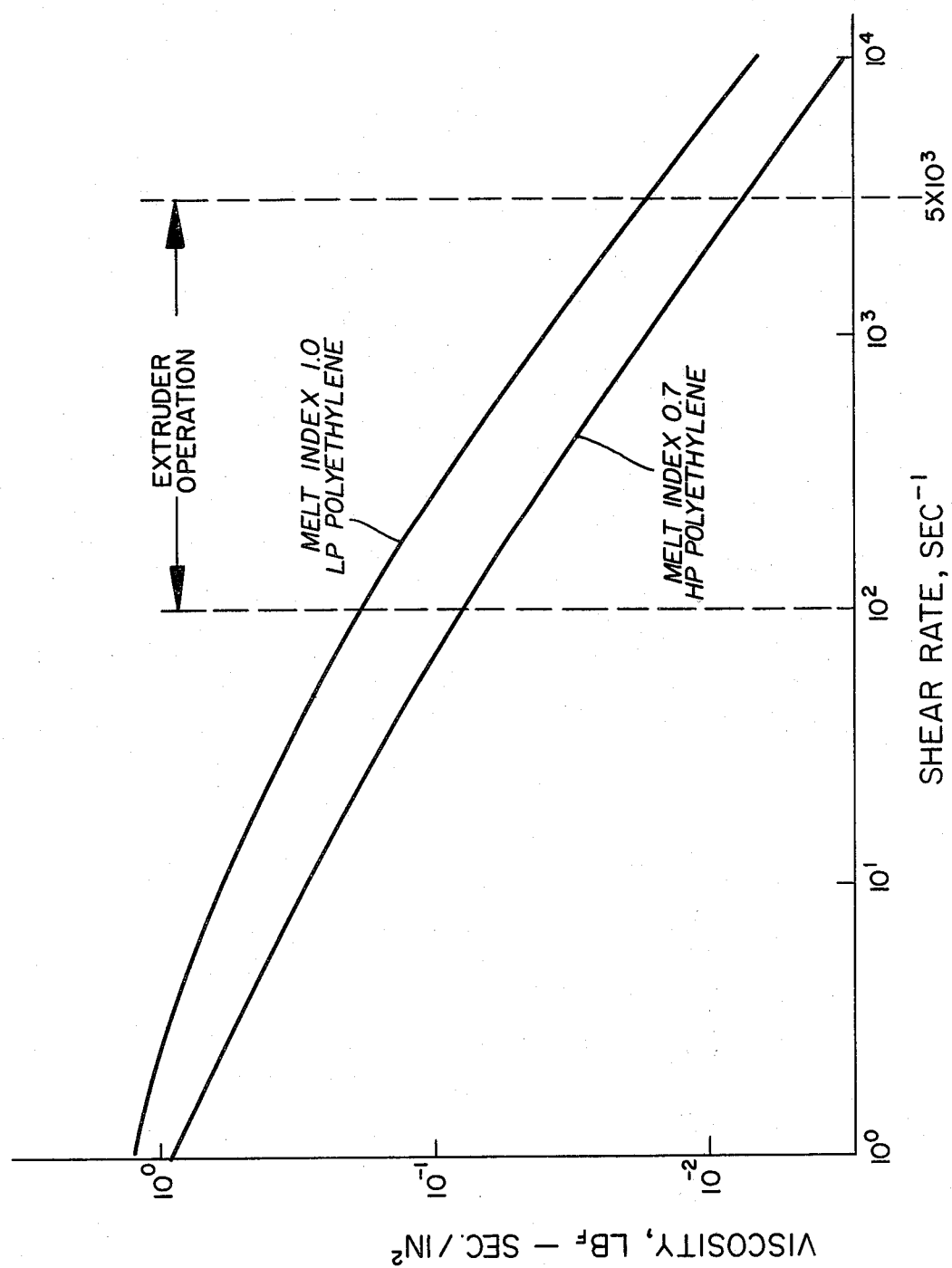
FIGS. 6 and 7 illustrate the slow shear thinning of two low pressure ethylene polymers used in the process of the present invention, as compared to two high pressure polyethylene resins of comparable density and melt index.
Figure 7:
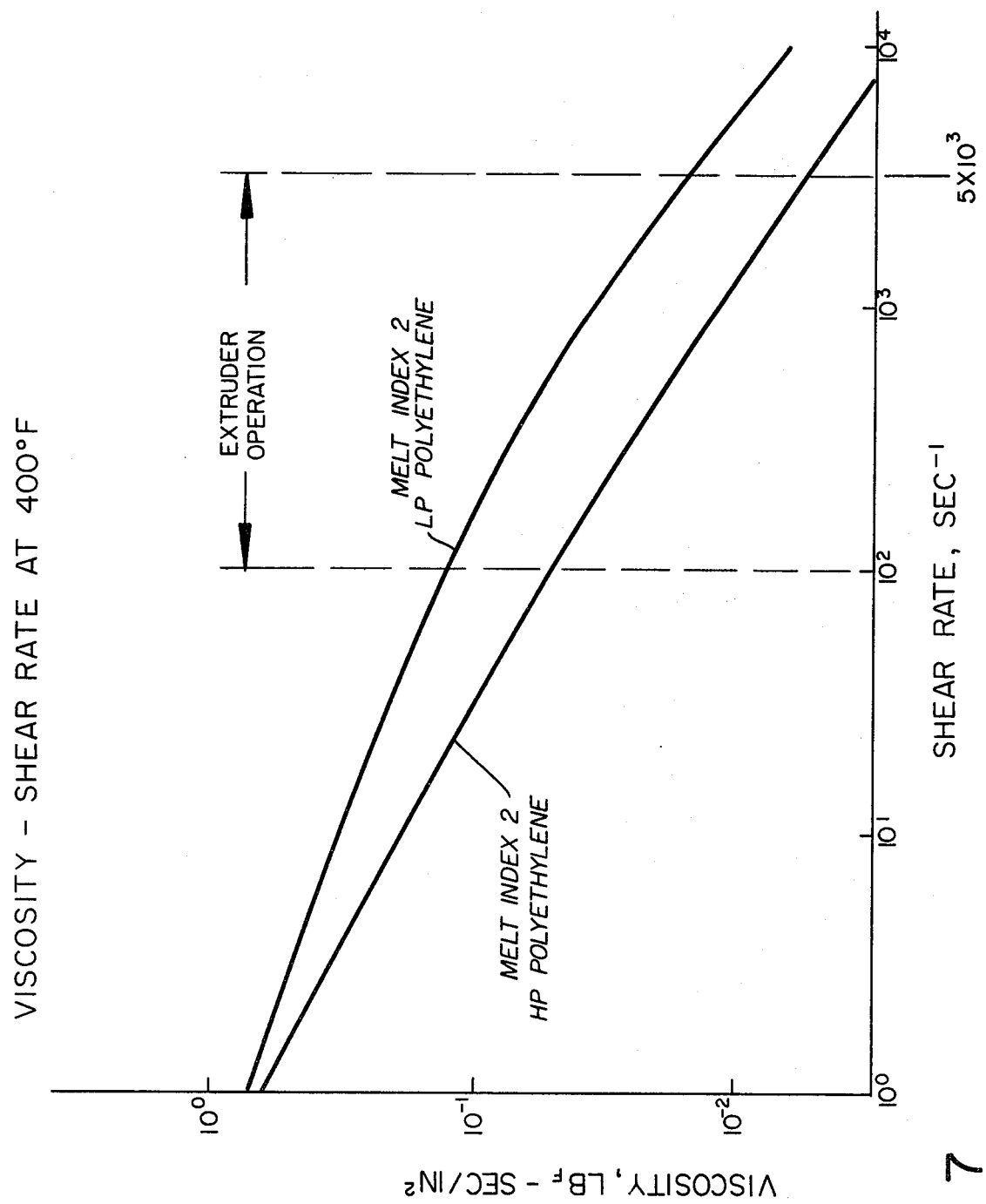

FIGS. 6 and 7 depict comparisons made in the shear rates of two such sets of polymers. FIG. 6 depicts a comparison between the shear rates of a low pressure ethylene-butene-1 copolymer used in the process of the present invention (LP Polyethylene) which has a melt index of 1.0 decigram/minute with a high pressure ethylene homopolymer (HP Polyethylene) which has a melt index of 0.7 decigrams/minute. Each of the polymers tested had a density of 0.92. The curves for the resins will be essentially the same, regardless of the density of the polymers (in the range of about 0.91 to 0.96). The position of the curves on the graph will change, however, as the melt index of the polymer being evaluated changes. As the density is raised, the position of the curve will be higher on the graph.

FIG. 7 depicts a comparison between the shear rates of a low pressure ethylene-butene-1 copolymer used in the process of the present invention (LP Polyethylene) which has a melt index of 2.0 decigrams/minute with a high pressure ethylene homopolymer (HP Polyethylene) which also has a melt index of 2.0 decigrams/minute. The polymers tested had a density of 0.92.

Although the extrusion process disclosed herein has been discussed with respect to the use therein of the polymers made in The Prior U.S. Applications, the extrusion process of the present invention can be used with other ethylene polymers (homopolymers and copolymers with one or more $C_3$ to $C_8$ comonomers) which are rapid melting and which experience slow shear thinning, regardless of the molecular weight distribution of such polymers. Such polymers, therefore, can have a relatively broad molecular weight range of about 2 to 10, and preferably of about 2 to 4.

The process of the present invention is also generally useful with resins having a melt index in the range of about 0.1 to 10 and preferably about 0.1 to 5 decigrams per minute. Such resins also preferably have a density of about 0.91 to 0.94 grams/cc.

What is claimed is:
1. A process comprising forming an extrudate from a rapidly melting ethylene polymer which experiences slow shear thinning by melt extruding said polymer through an extruder having an extrusion screw with a length to diameter ratio of between about 15:1 to 21:1.
2. A process as in claim 1 in which the extrusion screw has a length to diameter ratio of between about 15:1 to 18:1.
3. A process as in claim 2 in which said ethylene polymer is a copolymer of ethylene.
4. A process as in claim 3 in which ethylene polymer has a density of about 0.91 to 0.94 grams per cubic centimeter.
5. A process as in claim 4 in which said ethylene polymer has a melt index of about 0.1 to 10 grams per 10 minutes.
6. A process as in claim 5 in which said ethylene polymer has a molecular weight distribution of about 2 to 10.
7. A process as in claim 6 in which said ethylene polymer has a melt index of about 0.1 to 5.0 grams per 10 minutes, and a molecular weight distribution of about 2 to 4.

8. A process as in claim 1 in which said extrudate is in the form of film.

9. A process comprising forming an extrudate from a rapidly melting ethylene polymer which experiences slow shear thinning and which has a molecular weight distribution of about $\geq 2.2$ to $\leq 3.6$ and a melt index of about $\geq 0.5$ to about $\leq 5.0$ by melt extruding said polymer through an extruder having an extrusion screw with a length to diameter ratio of between about 15:1 to 21:1.

10. A process as in claim 9 in which the extrusion screw has a length to diameter ratio of between about 15:1 to 18:1.

11. A process as in claim 9 in which the ethylene polymer is a low density ethylene hydrocarbon copolymer.

12. A process as in claim 11 in which said copolymer is a copolymer of ethylene and at least one $C_3$ to $C_8$ alpha olefin having a melt index of about $\geq 0.5$ to about $\leq 5.0$ grams per 10 minutes.

13. A process as in claim 12 in which said copolymer is a copolymer of $\geq 90$ mol percent ethylene and $\leq 10$ mol percent of at least one $C_3$ to $C_8$ alpha olefin.

14. A process as in claim 13 in which said copolymer has a total unsaturation content of about $\geq 0.1$ to $\leq 0.3$ C=C/1000 C atoms.

15. A process as in claim 14 in which said copolymer has a melt flow ratio of about $\geq 18$ to $\leq 36$.

16. A process as in claim 9 in which said extrudate is in the form of film.

* * * * *

UNITED STATES PATENT AND TRADEMARK OFFICE
CERTIFICATE OF CORRECTION

PATENT NO. : 4,343,755
DATED : August 10, 1982
INVENTOR(S) : John C. Miller et al.

It is certified that error appears in the above-identified patent and that said Letters Patent is hereby corrected as shown below:

Column 2, line 39, after "flow" insert -- ratio --.

Column 4, line 14, "velocity" should read -- viscosity --.

Column 20, line 46, " <0.94" should read -- $\geq 0.94$ --.

Signed and Sealed this

Twenty-seventh Day of September 1983

[SEAL]

Attest:

GERALD J. MOSSINGHOFF

Attesting Officer        Commissioner of Patents and Trademarks